(12) United States Patent
Hamamoto et al.

(10) Patent No.: US 9,288,345 B2
(45) Date of Patent: Mar. 15, 2016

(54) DATA PROCESSING APPARATUS AND METHOD FOR PROCESSING DATA

(71) Applicant: CANON KABUSHIKI KAISHA, Tokyo (JP)

(72) Inventors: Akihiko Hamamoto, Zushi (JP); Takemasa Murata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/023,800

(22) Filed: Sep. 11, 2013

(65) Prior Publication Data

US 2014/0078536 A1    Mar. 20, 2014

(30) Foreign Application Priority Data

Sep. 14, 2012    (JP) .................................. 2012-203087

(51) Int. Cl.
*G06F 3/044* (2006.01)
*H04N 1/00* (2006.01)

(52) U.S. Cl.
CPC ....... *H04N 1/00392* (2013.01); *H04N 1/00411* (2013.01); *H04N 1/00466* (2013.01); *H04N 1/00474* (2013.01); *H04N 1/00477* (2013.01); *H04N 1/00482* (2013.01); *H04N 1/00501* (2013.01)

(58) Field of Classification Search
CPC ................................ G06F 3/0418; G06F 3/044
USPC ............ 345/173–175, 178; 178/18.01–18.07, 178/19.01–19.05
See application file for complete search history.

(56) References Cited

U.S. PATENT DOCUMENTS

| | | | | |
|---|---|---|---|---|
| 2003/0063269 | A1* | 4/2003 | Nozaki .......................... | 355/133 |
| 2011/0187661 | A1* | 8/2011 | Wakizaka et al. ............. | 345/173 |
| 2013/0241853 | A1* | 9/2013 | Tanaka ........................... | 345/173 |
| 2013/0265241 | A1* | 10/2013 | Thorn ............................ | 345/173 |
| 2013/0265276 | A1* | 10/2013 | Obeidat et al. ................ | 345/174 |
| 2013/0305174 | A1* | 11/2013 | Kim et al. ..................... | 715/765 |

FOREIGN PATENT DOCUMENTS

JP    2004-226802 A    8/2004

* cited by examiner

*Primary Examiner* — Ricardo L Osorio
(74) *Attorney, Agent, or Firm* — Canon USA Inc. IP Division

(57) ABSTRACT

An apparatus includes a detection unit configured to detect a touch operation performed on an operation panel that displays a display screen in which content of processing is set, a reception unit configured to receive the touch operation detected by the detection unit, and a control unit configured to control changes to a reception condition under which the reception unit receives the touch operation. In a case where touch time of the touch operation detected by the detection unit is shorter than a predetermined period of time, the control unit performs control for changing the reception condition such that the reception unit does not receive the touch operation in accordance with at least one of the content of the processing and content displayed on the display screen.

22 Claims, 16 Drawing Sheets

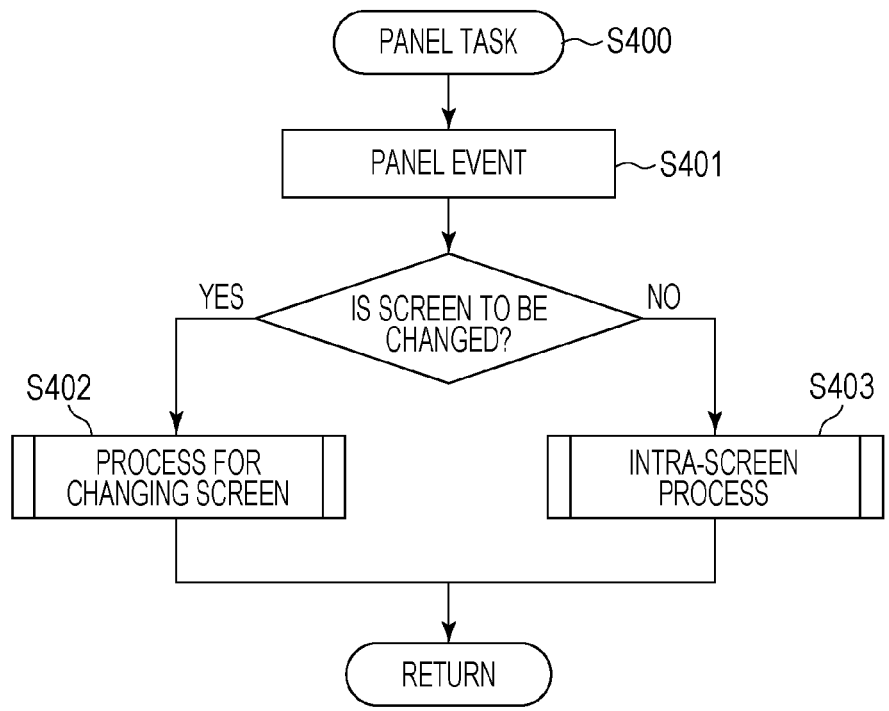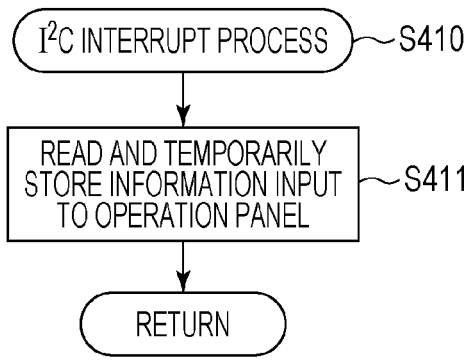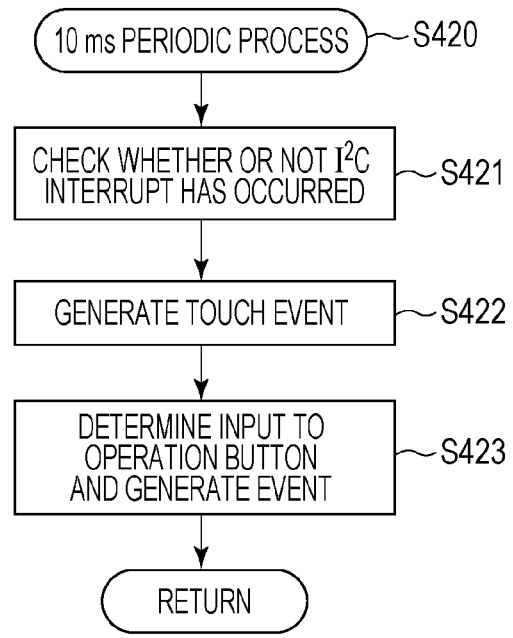

FIG. 6A

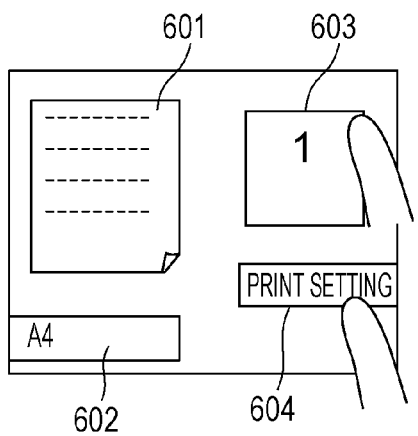

| OPERATION ON MULTI-COPY OBJECT | |
|---|---|
| TOUCH EVENT | ACTION |
| TOUCH | NO |
| TAP-AND-RELEASE | NUMBER OF COPIES INPUT POPUP |
| PUSH-AND-RELEASE | DITTO |
| MOVE | NO |
| PRESS-AND-HOLD | NO |

| OPERATION ON PRINT SETTING OBJECT | |
|---|---|
| TOUCH EVENT | ACTION |
| TOUCH | CHANGE FRAME TO YELLOW |
| TAP-AND-RELEASE | TO DETAILED SETTING SCREEN |
| PUSH-AND-RELEASE | DITTO |
| MOVE | NO |
| PRESS-AND-HOLD | NO |

FIG. 6B

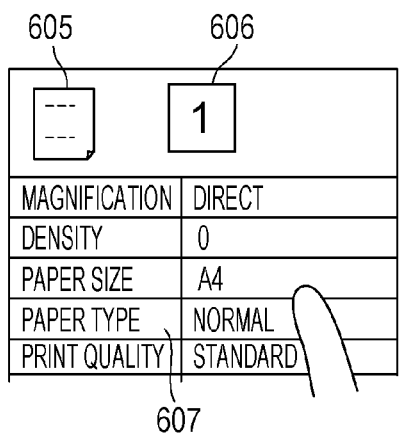

| OPERATION ON PRINT SETTING LIST OBJECT | |
|---|---|
| TOUCH EVENT | ACTION |
| TOUCH | CHANGE FRAME OF CORRESPONDING ITEM TO YELLOW |
| TAP-AND-RELEASE | NO |
| PUSH-AND-RELEASE | (WITHOUT MOVE) CORRESPONDING ITEM LIST POPUP |
|  | (WITH MOVE) SLIGHTLY ADJUST VERTICAL DISPLAY OF LIST |
| MOVE | PROCESS FOR VERTICALLY DRAGGING LIST |
| PRESS-AND-HOLD | NO |

| OPERATION ON UPWARD TRIANGULAR OBJECT | |
|---|---|
| TOUCH EVENT | ACTION |
| TOUCH | CHANGE UPWARD TRIANGULAR OBJECT TO YELLOW |
| TAP-AND-RELEASE | INCREASE NUMBER OF COPIES BY 1 (ROTATE) |
| PUSH-AND-RELEASE | DITTO |
| MOVE | NO |
| PRESS-AND-HOLD | INCREASE NUMBER OF COPIES BY 10 |

FIG. 6C

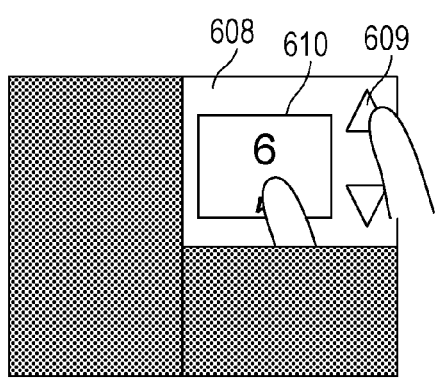

| OPERATION ON MULTI-COPY DRUM OBJECT | |
|---|---|
| TOUCH EVENT | ACTION |
| TOUCH | NO |
| TAP-AND-RELEASE | NO |
| PUSH-AND-RELEASE | (WITHOUT MOVE) POPUP RELEASE |
|  | (WITH MOVE) PROCESS FOR DETERMINING NUMBER OF COPIES |
| MOVE | PROCESS FOR DRAGGING NUMBER OF COPIES |
| PRESS-AND-HOLD | NO |

FIG. 12

|  | STANDBY SCREEN | DETAILED SETTING | GUIDE | RUNNING | JOB HISTORY | JOB CANCEL | ... |
|---|---|---|---|---|---|---|---|
| COPY | Y | Y | N | N | N | Y | ... |
| PHOTO | N | N | N | N | N | N | ... |
| SCANNING | Y | Y | N | N | N | Y | ... |
| PHOTO COPY | N | N | N | N | N | N | ... |
| FORM PRINTING | N | N | N | N | N | N | ... |
| CALENDAR PRINTING | N | N | N | N | N | N | ... |
| ... |  |  |  |  |  |  |  |

FIG. 13

| | 1 |
|---|---|
| MAGNIFICATION | DIRECT |
| DENSITY | 0 |
| PAPER SIZE | A4 |
| PAPER TYPE | NORMAL |
| PRINT QUALITY | STANDARD |

1501 (= 903)

| ACTION DEFINITIONS OF FORMAT ICON OBJECT ||
|---|---|
| TOUCH EVENT | ACTION |
| TOUCH | NO |
| TAP-AND-RELEASE | NO |
| PUSH-AND-RELEASE | TO COPY STANDBY |
| MOVE | RELEASE TARGET |
| PRESS-AND-HOLD | NO |

1502 (= 904)

| ACTION DEFINITIONS OF MULTI-COPY OBJECT ||
|---|---|
| TOUCH EVENT | ACTION |
| TOUCH | NO |
| TAP-AND-RELEASE | NO |
| PUSH-AND-RELEASE | NUMBER OF COPIES INPUT POPUP |
| MOVE | RELEASE TARGET |
| PRESS-AND-HOLD | NO |

1501 (= 903)

| ACTION DEFINITIONS OF UPWARD TRIANGULAR OBJECT ||
|---|---|
| TOUCH EVENT | ACTION |
| TOUCH | CHANGE UPWARD TRIANGULAR OBJECT TO YELLOW |
| TAP-AND-RELEASE | NO |
| PUSH-AND-RELEASE | INCREASE NUMBER OF COPIES BY 1 (ROTATE) |
| MOVE | RELEASE TARGET |
| PRESS-AND-HOLD | HIGH SPEED CHANGING OF NUMBER OF COPIES |

FIG. 16

1801: ACTION DEFINITIONS OF BUTTON COMPONENTS

| TOUCH EVENT | ACTION |
|---|---|
| TOUCH | SETTABLE |
| TAP-AND-RELEASE | SETTABLE |
| PUSH-AND-RELEASE | SETTABLE |
| FLICK | NOT SETTABLE |
| MOVE | RELEASE TARGET |
| PRESS-AND-HOLD | SETTABLE |

1802: ACTION DEFINITIONS OF DRAG COMPONENTS

| TOUCH EVENT | ACTION |
|---|---|
| TOUCH | NOT SETTABLE |
| TAP-AND-RELEASE | NOT SETTABLE |
| PUSH-AND-RELEASE | SETTABLE |
| FLICK | FLICK |
| MOVE | DRAG |
| PRESS-AND-HOLD | NOT SETTABLE |

1803

| MAGNIFICATION | DIRECT |
|---|---|
| DENSITY | 0 |
| PAPER SIZE | A4 |
| PAPER TYPE | NORMAL |
| PRINT QUALITY | STANDARD |

1804

| PAPER TYPE | NORMAL |
|---|---|
| PRINT QUALITY | STANDARD |
| LAYOUT | NONE |
| DOUBLE-SIDED PRINT SETTING | SINGLE-SIDED PRINTING |

DATA PROCESSING APPARATUS AND METHOD FOR PROCESSING DATA

BACKGROUND OF THE INVENTION

1. Field of the Invention

The present disclosure generally relates to data processing and, more particularly, to an apparatus including a touch panel and a method.

2. Description of the Related Art

It is known that touch panel operations are performed on operation panels of various devices such as copying machines. In various copying machines including touch panels, for example, intuitive user interfaces are provided by enabling users to make various settings relating to copying such as a paper feed tray, variable magnification, the number of copies, layout, and double-sided printing by directly performing touch operations on items displayed on the touch panels. However, there has been a problem in that settings that are not intended by a user are made when part of the user's arm, body, or clothes has touched the touch panel while the machine is operating.

Therefore, an image forming apparatus having a lock function by which changing of various settings is temporarily inhibited for a predetermined period of time until copying has been completed has been proposed (Japanese Patent Laid-Open No. 2004-226802).

The image forming apparatus disclosed in Japanese Patent Laid-Open No. 2004-226802 is able to suppress erroneous inputs after a copying process begins, but before the copying process begins, that is, for example, while parameters for the copying process are being set, it is difficult to suppress erroneous inputs.

In addition, although a dedicated lock button for inhibiting and enabling screen inputs is also disclosed in Japanese Patent Laid-Open No. 2004-226802, erroneous inputs might be made when the dedicated lock button is arranged on a touch panel. In addition, a certain type of touch panel detects a touch operation, for example, on the basis of a change in capacitance. Such a touch panel might erroneously detect a touch operation when a document to be read charged with static electricity has come into contact with the touch panel and then the charge of static electricity has decreased.

SUMMARY OF THE INVENTION

An aspect of the present disclosure provides a data processing apparatus and a method for processing data with which the issue in the related art is addressed. Another aspect of the present disclosure provides an apparatus and a method that may suppress erroneous inputs that are not intended by a user.

An apparatus in the present disclosure includes a detection unit configured to detect a touch operation performed on an operation panel that displays a display screen in which content of processing is set, a reception unit configured to receive the touch operation detected by the detection unit, and a control unit configured to control changes to a reception condition under which the reception unit receives the touch operation. In a case where touch time of the touch operation detected by the detection unit is shorter than a predetermined period of time, the control unit performs control for changing the reception condition such that the reception unit does not receive the touch operation in accordance with at least one of the content of the processing and content displayed on the display screen.

Further features of the present disclosure will become apparent from the following description of exemplary embodiments with reference to the attached drawings.

BRIEF DESCRIPTION OF THE DRAWINGS

FIGS. 4A to 4C are flowcharts illustrating a touch event of the image processing apparatus according to the first embodiment.

FIGS. 6A to 6C are diagrams illustrating operation images of touch events of the image processing apparatus according to the first embodiment.

FIG. 12 illustrates a table for determining the process for registering erroneous input countermeasures performed by the image processing apparatus according to the first embodiment.

FIG. 13 illustrates examples of action definitions of GUI component objects after the process for registering erroneous input countermeasures is performed by the image processing apparatus according to the first embodiment.

FIG. 16 illustrates examples of the action definitions of GUI component objects at a time when a flick event is recognized according to a third embodiment.

DESCRIPTION OF THE EMBODIMENTS

First Embodiment

Preferred embodiments of the present disclosure will be described in detail hereinafter with reference to the drawings. However, the embodiments that will be described hereinafter do not limit the present disclosure described in the claims.

Figure 1:
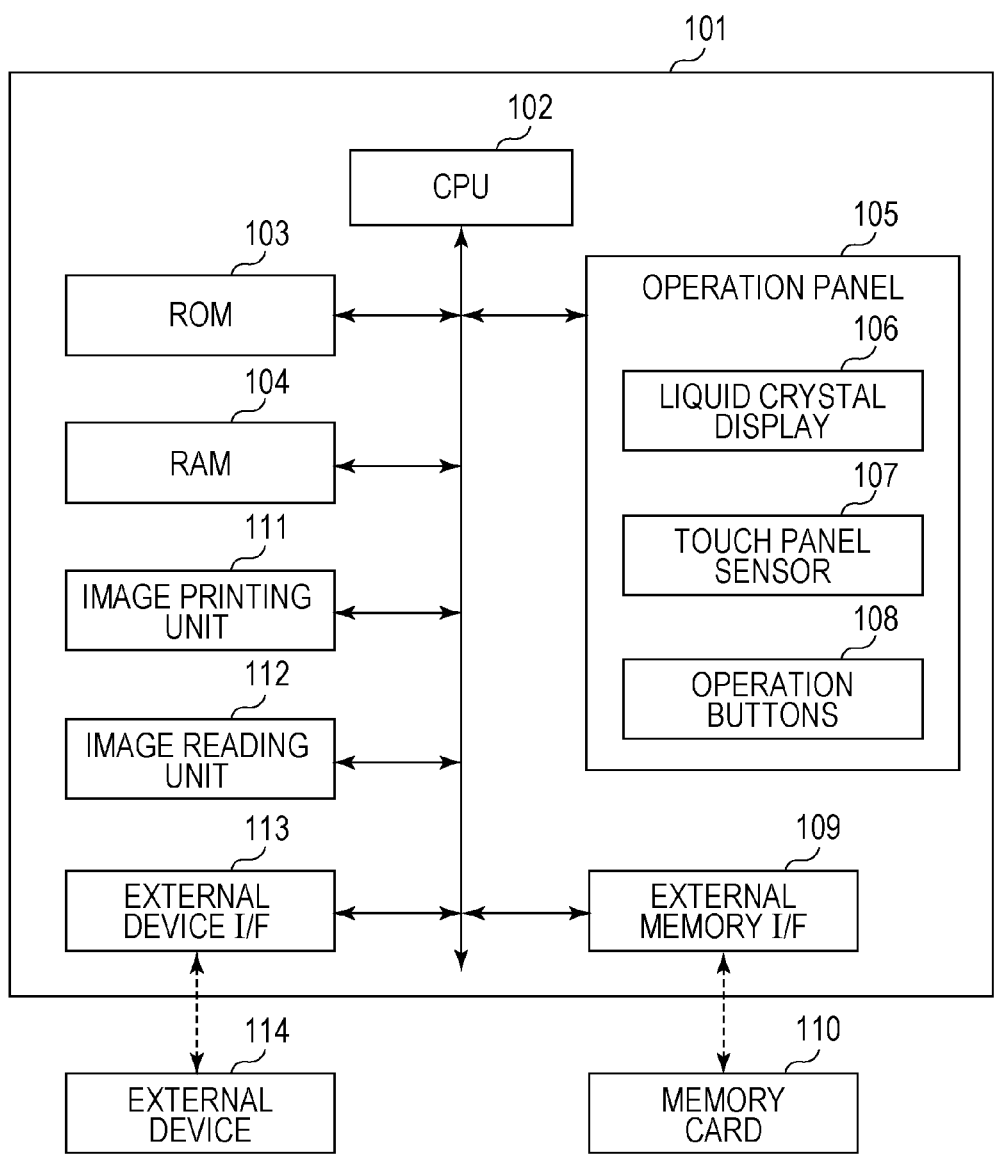
FIG. 1 is a function block diagram illustrating an image processing apparatus according to a first embodiment.

FIG. 1 is a functional block diagram illustrating an image processing apparatus according to a first embodiment.

As illustrated in FIG. 1, an image processing apparatus 101 includes a central processing unit (CPU) 102, a read-only memory (ROM) 103, a random-access memory (RAM) 104, an operation panel 105, an external memory interface (I/F) 109, and an external device I/F 113, which are connected to one another by a system bus.

The CPU 102 controls the image processing apparatus 101 on the basis of inputs from the operation panel 105 and the external device I/F 113. The CPU 102 loads a program stored in the ROM 103 or the like to the RAM 104 and runs the program on the RAM 104, thereby controlling the entirety of the image processing apparatus 101 according to the first embodiment.

The ROM 103 holds a program to be executed by the CPU 102, and the RAM 104 is used when the CPU 102 performs control.

The operation panel 105 includes a liquid crystal display 106, a touch panel sensor 107, and operation buttons 108. The liquid crystal display 106 displays the state of the image processing apparatus 101, a menu screen, or the like when a user has operated the image processing apparatus 101, and also displays images read from a memory card 110. The touch panel sensor 107 determines a user operation by detecting an instruction medium such as the user's finger that has touched the touch panel sensor 107. The operation buttons 108 include hard keys or the like and determine a user operation by detecting the user's finger that has pressed the operation buttons 108.

The external memory I/F 109 is connected to the memory card 110 such as a secure digital (SD) card provided outside the image processing apparatus 101 and communicates data. The external device I/F 113 communicates data with an external device 114 and may be, for example, a wired local area network (LAN), a wireless LAN, or a Universal Serial Bus (USB) connector. The external device 114 may be one of various information devices such as a personal computer or a server.

Figure 2A:
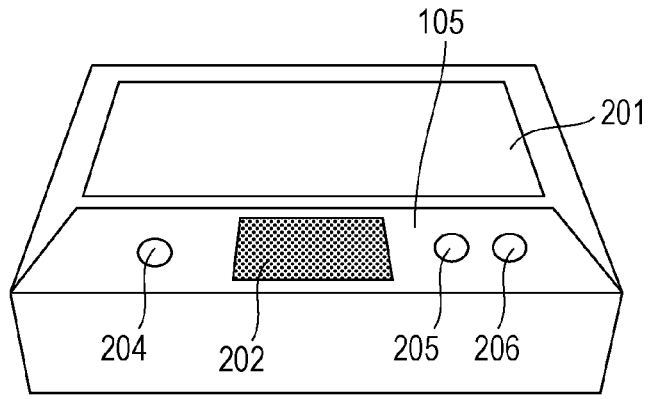
FIGS. 2A to 2C are a schematic diagram illustrating the image processing apparatus according to the first embodiment, a schematic diagram illustrating an operation panel, and a diagram illustrating the operation panel, respectively.
Figure 2B:
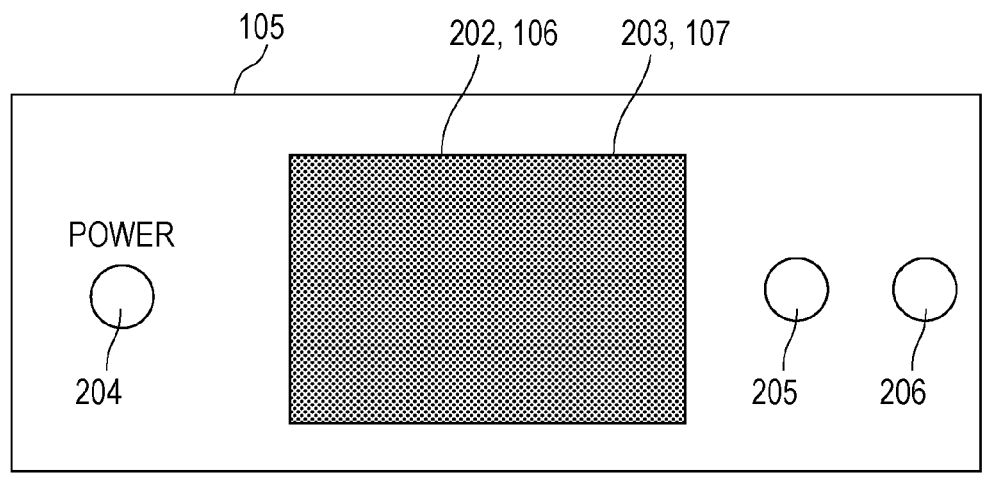
Figure 2C:
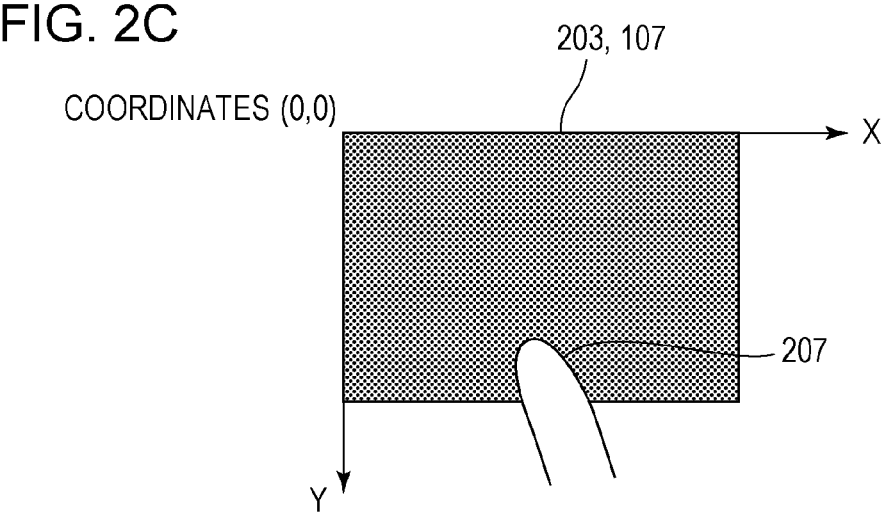

The image processing apparatus 101 includes an image printing unit 111 and an image reading unit 112, which are connected to the system bus. The image printing unit 111 has a function of printing a document read by the image reading unit 112, data received from the external device 114, and image data read from the memory card 110. In this embodiment, a printing method used by the image printing unit 111 is not particularly limited, and may be an inkjet method or an electrophotographic method. FIGS. 2A to 2C are a diagram schematically illustrating the image processing apparatus 101, a diagram schematically illustrating the operation panel 105, and a diagram illustrating the operation panel 105, respectively. FIG. 2A is an upper front perspective view of the image processing apparatus 101.

In FIG. 2A, a part 201 of the image reading unit 112 is an openable scanner cover for blocking light while an image is being read. As illustrated in FIG. 2A, the operation panel 105 is provided close to the image reading unit 112 in the image processing apparatus 101 according to this embodiment. More specifically, the operation panel 105 is provided at a position lower than an image reading surface of the image reading unit 112 and at the center of the image processing apparatus 101. FIG. 2B is a diagram schematically illustrating the operation panel 105 of the image processing apparatus 101. As illustrated in FIG. 2B, the operation panel 105 includes a liquid crystal display 202, a capacitive touch panel sensor 203 stacked on the liquid crystal display 202, and a power button 204 for turning on and off the image processing apparatus 101. The operation panel 105 also includes a start button 205 for starting execution of an application such as copying, scanning, or printing of a card image and a stop button 206 for stopping the application that is being executed. As used herein, the term "unit" generally refers to any combination of software, firmware, hardware, or other component that is used to effectuate a purpose.

Figure 3A:
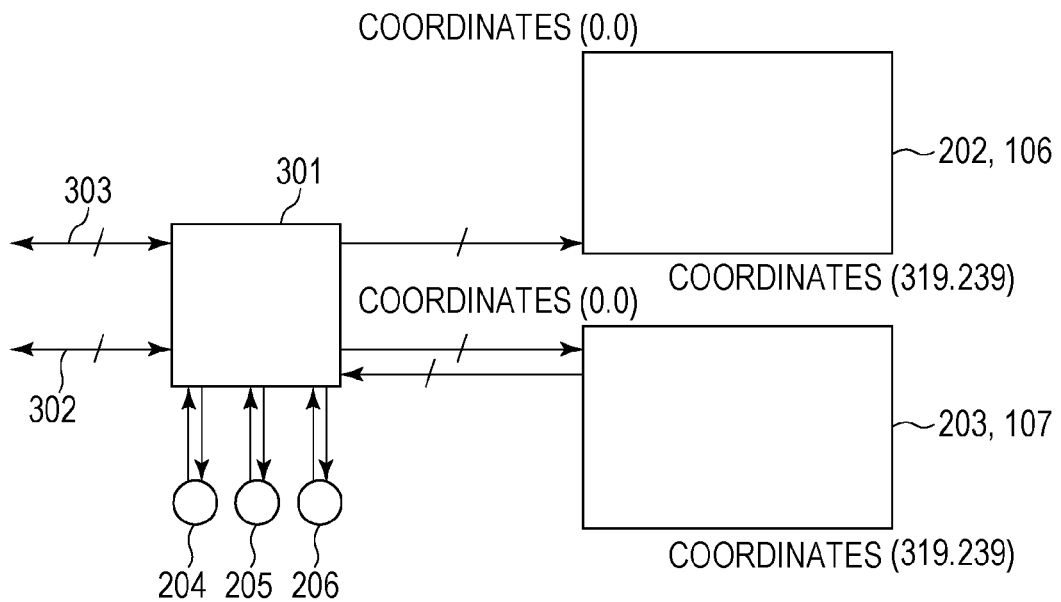
FIGS. 3A and 3B are an electrical block diagram illustrating the operation panel of the image processing apparatus according to the first embodiment and a diagram illustrating a data format, respectively.

FIG. 2C is a diagram illustrating the operation panel 105. FIG. 2C illustrates a state in which the user's finger 207 is touching the touch panel sensor 107 (203). The touch panel sensor 107 detects a touch operation and a touched position by detecting a change in capacitance caused when the touch panel sensor 107 is touched by a finger, a conductive medium, or the like. The touch panel sensor 107 detects, under control of the CPU 102, a "touch operation" in which the user touches a surface of the liquid crystal display 106, a "tap operation" in which a finger that has touched the touch panel sensor 107 leaves the touch panel sensor 107 without moving on the surface of the touch panel sensor 107, a "drag operation" in which a finger that has touched the touch panel sensor 107 moves on the surface of the touch panel sensor 107, and a "release operation" in which a finger that has touched the touch panel sensor 107 leaves the touch panel sensor 107. The CPU 102 determines the user operation on the basis of a relationship between the coordinates at which the touch panel sensor 107 has detected an operation, the timing, and content displayed on the liquid crystal display 106 (202). Since the touch panel sensor 107 detects a change in capacitance, the touch panel sensor 107 may detect a "touch operation" when a finger, a conductive medium, or the like has approached the touch panel sensor 107 and changed the capacitance even if the finger, the conductive medium, or the like has not touched the touch panel sensor 107. FIG. 3A is an electrical block diagram illustrating the operation panel 105 illustrated in FIGS. 2A and 2B. The operation panel 105 includes the liquid crystal display 202, the capacitive touch panel sensor 203, and a single-chip microcomputer 301 that controls input and output of the liquid crystal display 202 and the touch panel sensor 203. The single-chip microcomputer 301 detects input states of the touch panel sensor 203 and the buttons 204 to 206 at certain time intervals, and transmits results of the detection to the CPU 102 through an I$^2$C bus 302 using a data format illustrated in FIG. 3B.

Figure 3B:
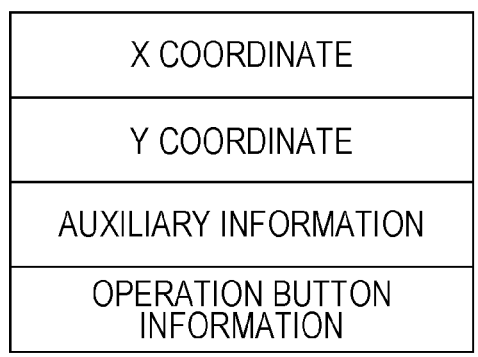

Here, the data format of the results of the detection performed in the operation panel 105 will be described. In this embodiment, as illustrated in FIG. 3B, the data format of the results of the detection includes an x coordinate and a y coordinate, which are input position coordinates on the touch panel sensor 203, auxiliary information indicating whether or not inputs have been detected at a plurality of points, and operation button information. The operation button information is information indicating whether or not the operation buttons 204 to 206 are pressed. The single-chip microcomputer 301 according to this embodiment is configured not to transmit a plurality of input position coordinates when fingers have touched the touch panel sensor 203 at a plurality of coordinate positions, and therefore the auxiliary information is included.

The CPU 102 generates display data in a frame buffer of the RAM 104 in accordance with information input to the operation panel 105 and various external events. The data in the frame buffer is transmitted to the single-chip microcomputer 301 through a low-voltage differential signaling (LVDS) bus 303 and converted in accordance with output characteristics. The generated data is displayed on the liquid crystal display 202.

FIGS. 4A to 4C are flowcharts schematically illustrating the entirety of processes performed by the CPU 102 for an event of the operation panel 105.

The processes for an event of the operation panel 105 include a panel task, which is a foreground task driven by the event, an I²C interrupt process in which a transmission request is received from the single-chip microcomputer 301, and a periodic process in which events relating to various touches are determined and generated on the basis of information input to the operation panel 105.

First, the I²C interrupt process will be described. When the single-chip microcomputer 301 has detected an input to the touch panel sensor 107 or the operation buttons 108, the single-chip microcomputer 301 generates an I²C interrupt for the CPU 102 through the I²C bus 302 (S410). More specifically, the single-chip microcomputer 301 determines serial communication between a master and a slave according to an I²C bus protocol. Upon receiving the I²C interrupt, the CPU 102 reads information input to the operation panel 105 in the above-described data format (refer to FIG. 3B) in accordance with an I²C read protocol. The CPU 102 then temporarily stores a result in a certain region of the RAM 104 and ends the interrupt process (S411).

In a 10 ms periodic process, the CPU 102 checks whether or not there has been an I²C interrupt, that is, whether or not an I²C interrupt has occurred (S421), and performs a process for generating a touch event (S422), which will be described later, using a result of the check as an argument. In the process for generating a touch event, the CPU 102 determines the type of touch operation on the basis of the input information temporarily stored in the RAM 104, and generates a touch event according to a result of the determination using coordinate position information as an argument. Finally, the CPU 102 executes a process for determining an input to an operation button and generating an event (S423), and ends the 10 ms periodic process (background process).

The generated touch event and operation button event are handled in the panel task as panel events. In addition to the user operation events input to the operation panel 105, panel events include reception of data from the external device I/F 113 and the external memory I/F 109 and external events performed on the image processing apparatus 101 such as opening of a cover for changing ink. The CPU 102 selectively executes a process for changing the screen in which the screen changes to another screen (S402) or an intra-screen process in which the state of the screen changes (S403), and ends the panel task.

Figure 5:
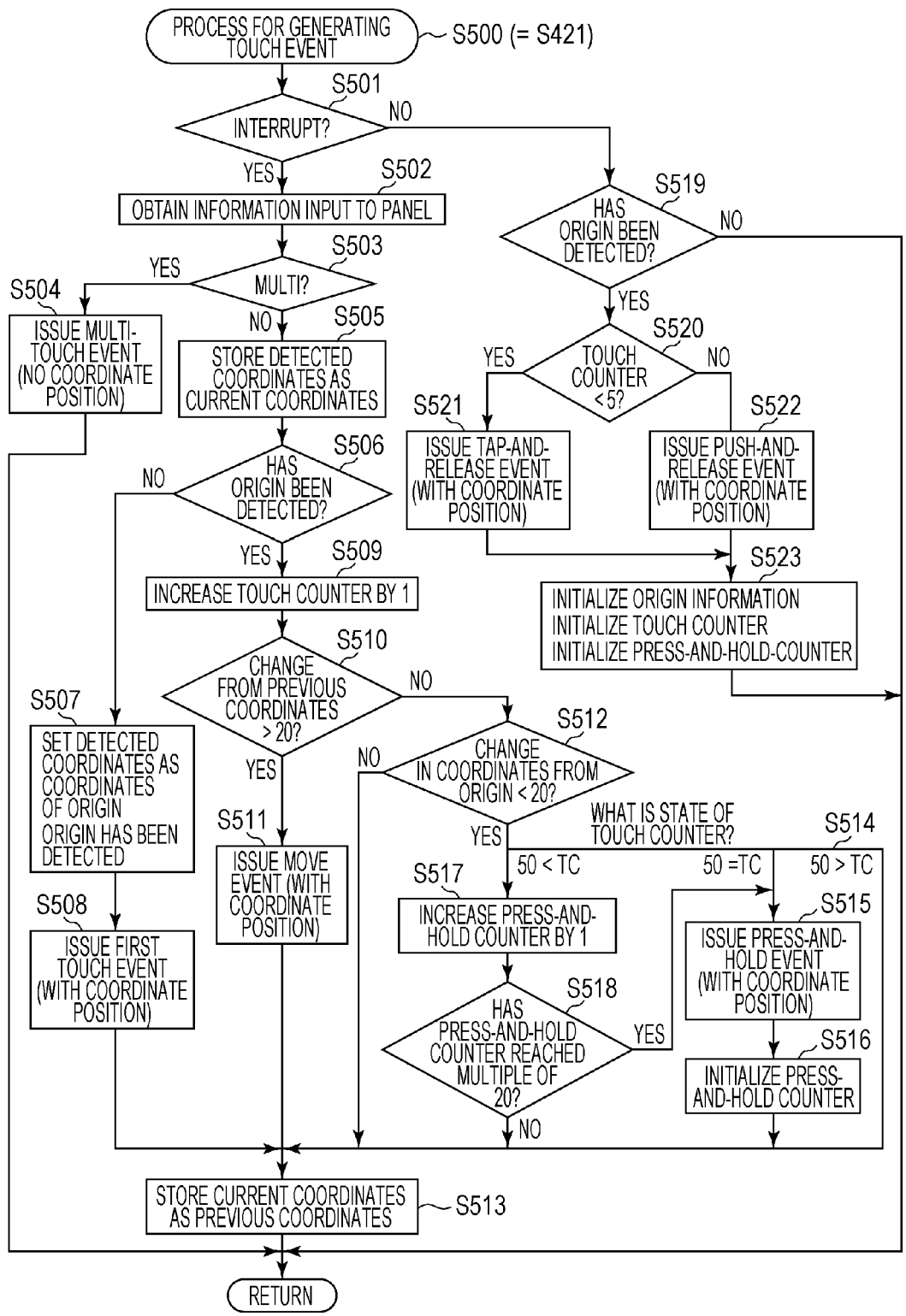
FIG. 5 is a flowchart illustrating a process for generating a touch event performed by the image processing apparatus according to the first embodiment.

FIG. 5 is a flowchart illustrating the process for generating a touch event executed by the CPU 102. The process for generating a touch event is executed in S422 of the 10 ms periodic process.

First, the CPU 102 determines whether or not there has been an I²C interrupt, which is an argument (S501). If there has been an I²C interrupt, the CPU 102 obtains the information input to the operation panel 105, which has been temporarily stored (S502). Next, the CPU 102 refers to the auxiliary information in the information input to the operation panel 105 and determines whether or not a plurality of coordinate positions have been detected (S503).

If a plurality of coordinate positions have been detected, the CPU 102 issues only a multi-touch event without adding the coordinate position information (S504), and ends the process. This is because it is considered that the detection of the plurality of coordinate positions in this multi-touch event is not based on an operation intended by the user.

If a plurality of coordinate positions have not been detected, the CPU 102 stores the detected coordinate position as current coordinates (S505), and then the CPU 102 determines whether or not the input is a first input in a state in which nothing is in contact with the touch panel (S506). That is, the CPU 102 determines whether or not an origin has been detected in a predetermined period (10 ms).

If an origin has not been detected (the flag has not been set) and the coordinates have been detected in a current 10 ms period, the CPU 102 determines that the input is a first touch event, which is a first touch in a state in which nothing is in contact with the touch panel, and the process proceeds to S507. The CPU 102 saves origin information including a flag indicating whether or not an origin has been detected and the detected coordinates in the RAM 104 for a next 10 ms periodic process and later (S507), and issues the first touch event using the coordinate position of the origin as an argument (S508).

If it is determined in S506 that an origin has been detected, that is, if something remains in contact with the touch panel, the CPU 102 increases by 1 a touch counter that counts the time elapsed since a first touch event is issued (S509). Thereafter, by comparing coordinate information 10 ms ago stored as previous coordinates with the current coordinate information, the CPU 102 determines whether or not a change from the previous coordinates is larger than a certain value (S510). That is, the CPU 102 determines whether or not a difference between the previous coordinate information and the current coordinate information is larger than the certain value. The certain value is a threshold for the amount of change for distinguishing movement of the user's finger from a press-and-hold operation in which a graphical user interface (GUI) component object is pressed and held. The threshold may be appropriately determined in accordance with the resolution and the detection accuracy of the touch panel sensor 107 mounted on the image processing apparatus 101. In this embodiment, 20 is set as the certain value.

If the change from the previous coordinates is larger than the certain value, a move event is issued using the detected coordinates as an argument (S511). This is because when the change from the previous coordinates is larger than the certain value (20 in this embodiment), the operation may be considered a movement operation on a GUI component object intended by the user. Because a move event is issued when the threshold has been exceeded once in this embodiment, a move event may be issued in 10 ms at fastest. As an action corresponding to the move event, display is updated in accordance with the amount of operation. Although a move event is issued when the threshold has been exceeded once in this embodiment, the present disclosure is not limited to this. For example, in a system configuration in which display drawing speed is low, the issuance period of a move event may be longer, that is, for example, a counter may be added and a move event may be issued when the threshold has been exceeded five times.

If the change from the previous coordinates is smaller than or equal to the certain value, that is, if the amount of change is smaller than or equal to the threshold, a process for determining a press-and-hold mode is performed (S512). More specifically, the CPU 102 determines whether or not a change in coordinates from the origin is smaller than a threshold by comparing the coordinates of the origin stored in S507 and the current coordinates. In this embodiment, whether or not a change in coordinates from the origin is smaller than 20 is determined.

If the change in coordinates from the origin is smaller than 20, a process for identifying the type of press-and-hold operation is executed using the touch counter and a press-and-hold counter. This is because when the change in coordinates is smaller than the threshold, it is considered that a touch operation on the GUI component object is being performed. In this embodiment, when the touch counter has not reached 50, that is, when 500 ms has not elapsed, it is determined that the press-and-hold mode has not been established (S514), and the process proceeds to S513. When the counter has reached 50, a first press-and-hold event is issued (S515) and the press-and-hold counter is initialized (S516), and then the process proceeds to S513. When the touch counter has exceeded 50, the press-and-hold mode is still established. Therefore, the press-and-hold counter increases by 1 (S517), and each time the press-and-hold counter reaches a multiple of 20 (S518), a press-and-hold event is issued using a coordinate position as an argument (S515). That is, after the press-and-hold mode is established, press-and-hold events are issued at intervals of 200 ms.

In S513, the current coordinates are stored as previous coordinates for a next 10 ms periodic process, and the process ends. That is, regardless of whether the operation is the first touch event, the move event, or the press-and-hold mode, the current coordinates are stored as previous coordinates, and the process ends.

On the other hand, if it is determined in S501 that there has been no interrupt, which means that there has been no input to the touch panel in at least 10 ms, the CPU 102 makes a determination as to a release, in which a finger leaves the touch panel. More specifically, the CPU 102 refers to the origin information including a flag indicating whether or not a first input has been made in a state in which nothing is in contact with the touch panel and a coordinate position, and determines whether or not an origin has been detected (S519).

If an origin has not been detected (the flag has not been set), the CPU 102 does not make an event request and ends the process without performing any processing.

If an origin has been detected, the CPU 102 refers to the touch counter, and performs a certain release operation in accordance with the time elapsed since the origin is touched. More specifically, the CPU 102 determines whether or not the touch counter has reached a certain number (5 in this embodiment) (S520). If the touch counter has not reached the certain number (5 in this embodiment), that is, if a GUI component object is lightly touched and the finger immediately leaves the GUI component object, a tap-and-release event is issued using the previous coordinate position stored in S513 as an argument (S521). If the touch counter has reached the certain number (5 in this embodiment), a push-and-release event is issued using the previous coordinate position as an argument (S522). A case in which the touch counter has reached the certain number is, for example, a case in which a GUI component object is firmly pressed and then released, a case in which a finger leaves a GUI component object after moving the GUI component object, or a case in which a finger leaves a GUI component object after a press-and-hold operation.

After issuing the release event, the CPU 102 initializes various pieces of work information (the origin information, the touch counter, a press-and-hold flag, and the press-and-hold counter) (S523), and ends the process.

FIGS. 6A to 6B are image diagrams illustrating relationships between an operation performed on a GUI component object and a touch event generated in the process illustrated in FIG. 5.

FIG. 6A illustrates a copy standby screen displayed when a copy icon has been selected in a home screen, which is initially displayed after the image processing apparatus 101 is turned on. In the copy standby screen, a format object 601 for selecting a print format, a paper size setting object 602, a multi-copy object 603, and a print setting object 604 are displayed.

The format object 601 is configured to be enable the user to easily select a setting relating to a print format such as double-sided printing or allocation printing (layout printing) using a limited number of combinations. The paper size setting object 602 indicates a paper size setting, and the multi-copy object 603 indicates the number of copies to be printed. By selecting the print setting object 604, a print detailed setting screen may be displayed. Even if a first touch event is issued by a user operation performed on the multi-copy object 603 in S508, which has been described above, no action occurs. On the other hand, if a tap-and-release event or a push-and-release event is issued in S521 or S522, respectively, a number of copies changing object, which will be described later, pops up. If a first touch event is issued by a user operation performed on the print setting object 604, an outer frame of the print setting object 604 is changed from white to yellow as a feedback to the user operation. Thereafter, if a tap-and-release event or a push-and-release release event is issued, the copy standby screen ends, and the copy detailed setting screen (FIG. 6B) is displayed. With respect to the paper size setting object 602, a paper size selection component pops up in accordance with a tap-and-release event or a push-and-release event as in the case of the multi-copy object 603.

FIG. 6B illustrates the copy detailed setting screen displayed when the print setting object 604 has been selected by a tap-and-release event or a push-and-release event in the copy standby screen. In the copy detailed setting screen, an object 605, a multi-copy object 606, and a print setting list object 607 are displayed. The object 605 is a format icon button that functions as a trigger to return to the copy standby screen. The multi-copy object 606 functions in the same way as the multi-copy object 603 in the copy standby screen, although the size and the position thereof are different from those of the multi-copy object 603.

The print setting list object 607 indicates items of various print settings and selected content. The print setting list object 607 includes a plurality of label components and list components each including a single tool bar. In this embodiment, the print setting list object 607 is a component-type GUI component object in which seven items, namely magnification, density, paper size, paper type, print quality, layout, and double-sided print setting, are vertically arranged. The number of items displayed in the print setting list object 607 at a time may be set to a certain value. At this time, when the number of items of various print settings is larger than the set number, the items may be displayed by performing an operation (vertical scroll operation) in which a finger touches the print setting list object 607, moves in a vertical direction (Y axis), and then leaves the print setting list object 607. In this embodiment, one of the displayed items of the print setting list object 607 may be changed by performing a touch-and-release operation in which the item is touched by a finger and then released.

In the vertical scroll operation, some users might make a quick, flipping movement (flick operation), and others might make a slow movement (drag operation). The flick operation might be detected in S508 in the flowchart of FIG. 5 as a first touch event and then not detected in S511 as a move event but detected in S521 as a tap-and-release event. In this case, although the user intends to vertically scroll the list through the flick operation, an item corresponding to the coordinates of the first touch is undesirably selected. Therefore, in the copy detailed setting screen, erroneous detection that does not match the intention of the user is suppressed by causing an action only in the case of a push-and-release event and causing no processing (NO) of an action in the case of a tap-and-release event. When a move event has been detected, a process for vertically dragging the list is performed in which the positions at which the items of the print setting list object 607 are displayed are moved by an amount of change in the Y coordinate, which is provided as an argument. Thereafter, if the user's finger leaves the print setting list object 607, a push-and-release event is detected in S522 illustrated in FIG. 5, and a process for slightly correcting the vertical display of the list is executed. In the case of a push-and-release event during which no move event is detected, a corresponding item list pops up and enables the user to select one of parameters that may be selected for the item.

FIG. 6C is a diagram illustrating a pop-up display screen of a number of copies changing object 608 displayed when the multi-copy object 603 or 606 has been selected in the copy standby screen or the copy detailed setting screen, respectively. In the pop-up display screen of the number of copies changing object 608, a gray screen is superimposed upon the entirety of the screen before the pop-up operation, and the number of copies changing object 608 is added as an upper layer of the gray screen. As with the print setting list object 607, the number of copies changing object 608 is a component-type object including a combination between a plurality of basic GUI components. The number of copies changing object 608 includes button-shaped objects 609 and a multi-copy drum object 610 having a vertical drum shape. The button-shaped objects 609 may receive a press-and-hold event. More specifically, the button-shaped objects 609 controls the number of copies in accordance with a press-and-hold event, which is a touch that lasts 500 ms, and subsequent periodic press-and-hold events at intervals of 200 ms, and causes the multi-copy drum object 610 to display the number of copies as an animation. Thus, in FIG. 6C, various operations performed on particular operation regions, that is, more specifically, regions other than the gray screen, are received in the display screen. Between the button-shaped objects 609, an upward triangle indicates an increase, and a downward triangle indicates a decrease. In this embodiment, increase/decrease display control is performed such that the number of copies increases one by one until the number of copies reaches a multiple of 10, and then the number of copies increases by 10 after reaching a multiple of 10. As with the print setting list object 607, the multi-copy drum object 610 may receive a move event. Therefore, in order to avoid erroneous recognition, no action is set for a tap-and-release event, and two types of actions are set for a push-and-release event depending on whether or not a move event is detected during the push-and-release event. In the case of a push-and-release event without a move event, the screen before the pop-up operation is displayed again. In the case of a push-and-release event after a move event, a process for determining the number of copies is executed as described above. More specifically, the number of copies is determined and displayed using an algorithm for determining the number of copies in accordance with an operation performed along the Y axis immediately before the release event and the number of copies displayed at the time of the release event.

As described above, in the case of an object that may receive a move event, no action is set for a tap-and-release event, and an action is set only for a push-and-release event. In the case of an object that does not receive a move event, actions are set for both a tap-and-release event and a push-and-release event. In accordance with this basic rule, separate GUI components that are commonly used and GUI components that are combinations between separate GUI components are provided as a common GUI component library, which are component classes whose action rules for touch events have been defined.

Figure 7:
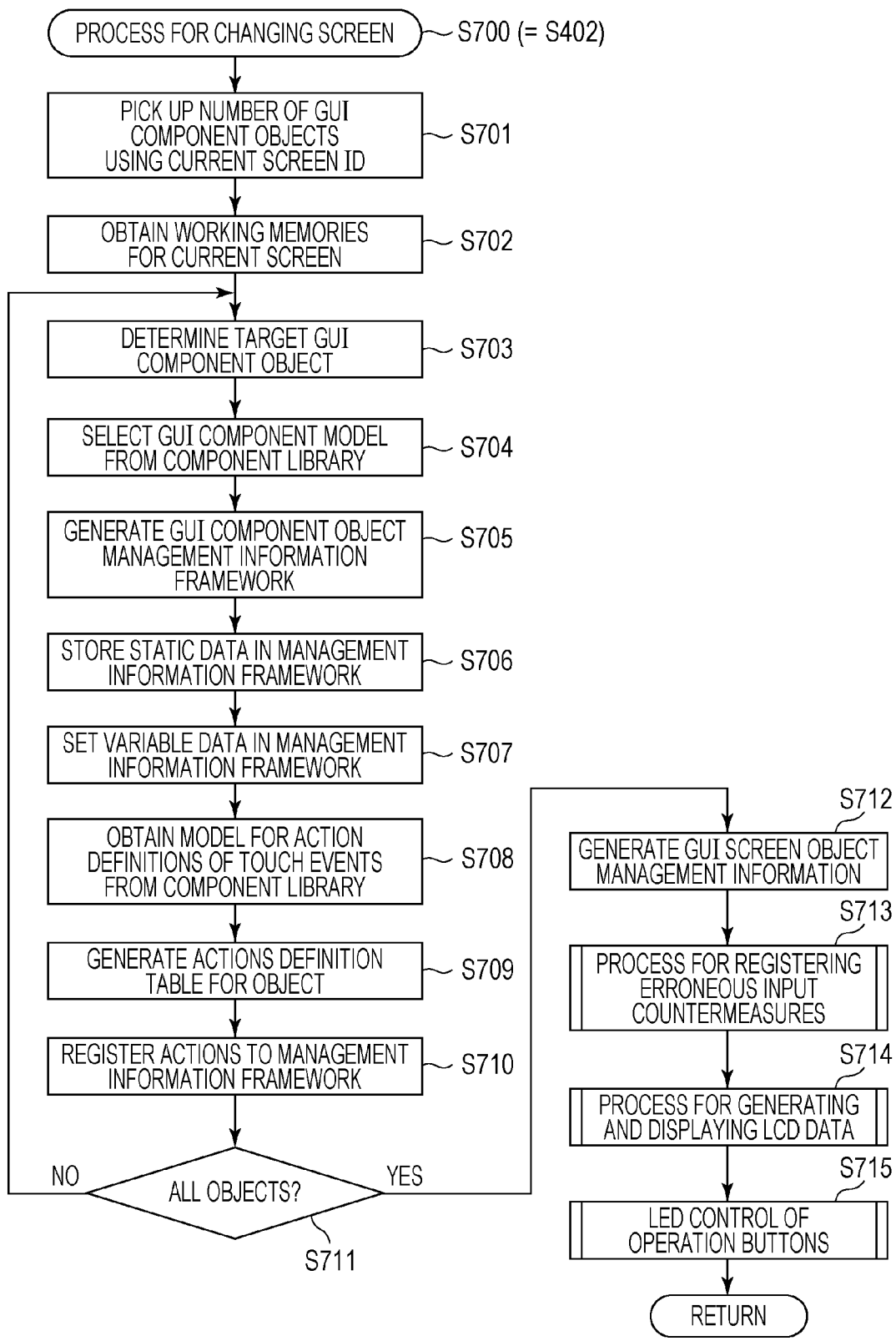
FIG. 7 is a flowchart illustrating a process for changing a screen performed by the image processing apparatus according to the first embodiment.
Figure 8:
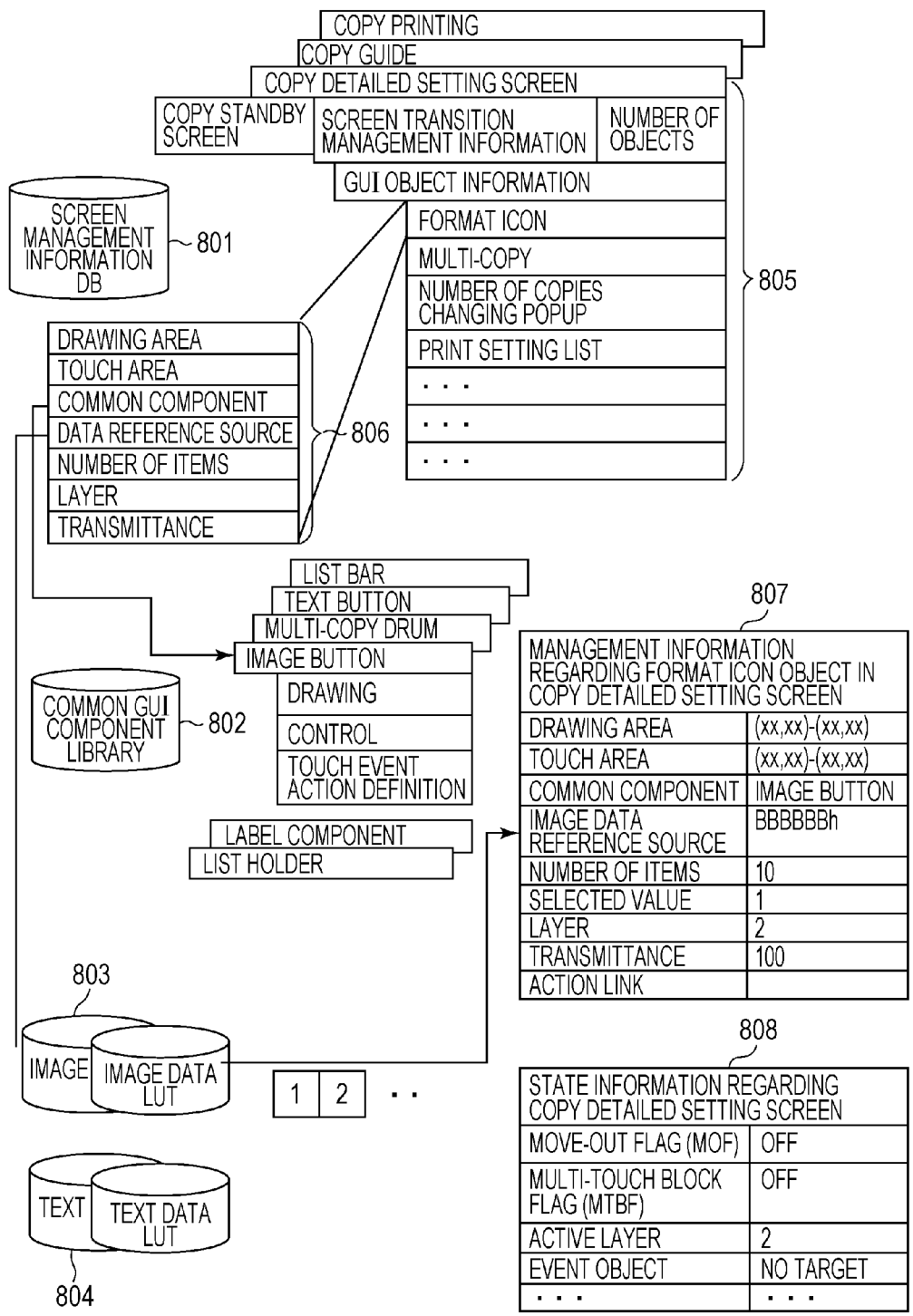
FIG. 8 is an image diagram illustrating generation of graphical user interface (GUI) object management information from a screen identifier (ID) according to the first embodiment.
Figure 9:
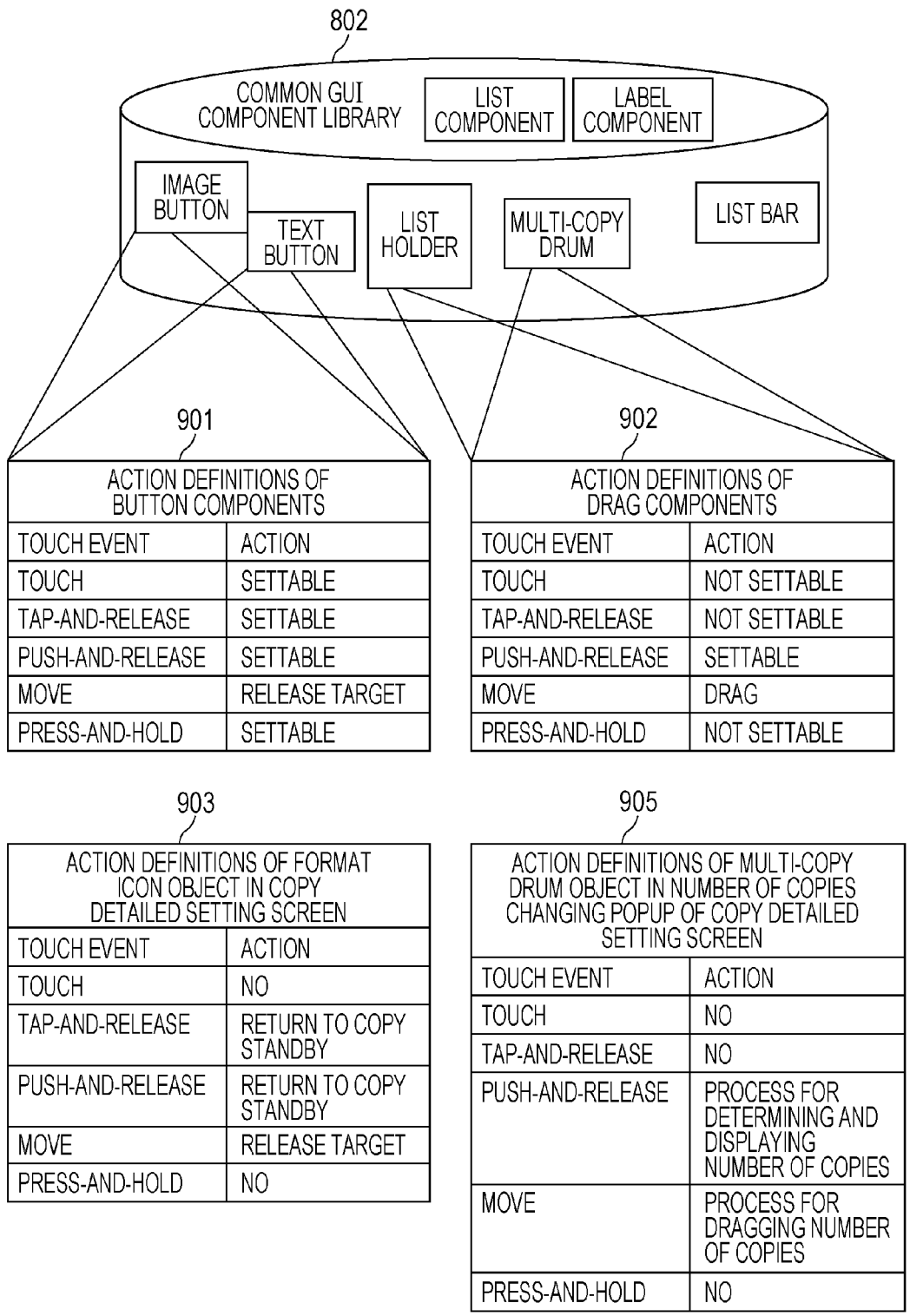
FIG. 9 is an image diagram illustrating generation of a screen from a GUI component library of the image processing apparatus according to the first embodiment.

FIG. 7 is a flowchart illustrating the process for changing the screen, which is one of the foreground processes, executed in S402. FIG. 8 is an image diagram illustrating generation of GUI object management information using a screen identifier (ID), and FIG. 9 is an image diagram illustrating generation of the action definitions of GUI component objects using the common GUI component library. Each screen is managed using a unique screen ID.

In a screen management information database (DB) 801 illustrated in FIG. 8, various pieces of information are defined for each screen. Management information regarding each screen includes screen transition management information for defining how to leave a transition history when the screen has changed, the number of GUI component objects used in each screen, and an information group for each GUI component object. In the screen management information DB 801, screen management information regarding all screens used by the image processing apparatus 101 is arranged in a particular region of the ROM 103 in such a way as to enable a search using a screen ID.

When the process for changing the screen has begun (S700), screen management information to be used for a current screen is detected using a current screen ID provided as an argument, and the number of GUI component objects used in the screen is obtained (S701). Next, various working memories to be used for the screen are obtained (S702).

Thereafter, all the GUI component objects to be used in the screen are generated as frameworks that have obtained management information. For example, screen management information 805 for the copy detailed setting screen illustrated in FIG. 8 includes objects displayed at the time of activation of the screen, such as the format icon object, the multi-copy object, and the print setting list object, and pop-up objects such as the number of copies changing object displayed when the multi-copy object has been selected.

First, a current target GUI component object is determined (S703).

In FIG. 8, GUI component object information 806 regarding the format icon object to be used in the copy detailed setting screen is included in the screen management information DB 801. The GUI component object information 806 includes information regarding the coordinates of a drawing area, information regarding the coordinates of a touch area, common component information for identifying the type of component to be used stored in the common GUI component library, and drawing-related information such as a data reference source, the number of items, the layer, and transmittance.

As illustrated in FIG. 9, a common GUI component library 802 includes basic components such as image buttons, text buttons, text boxes, and list bars and components configured by combining the basic components, such as list holders and label components. The common GUI component library 802 is arranged in a particular region of the ROM 103. In the data reference source of the GUI component object information 806, a reference address of image data or text data in the ROM 103 is described. The image data or the text data may be a single piece of data, or may have an array structure corresponding to a plurality of options. In the case of image data or text data having the array structure corresponding to a plurality of options, the number of items is described. The image data or the text data is arranged in a particular region of the ROM 103 as an image data lookup table (LUT) 803 or a text data LUT 804 in such a way as to enable reference.

The structure of GUI component object management information to be generated in the RAM 104 is determined in accordance with a common component that serves as a base. The CPU 102 refers to common component information regarding the target GUI component object in the ROM 103 and selects a GUI component model (S704), and then generates a management information framework for the target GUI component object in the RAM 104 (S705). Next, the CPU 102 stores static data in the management information framework (S706). An example of management information 807 regarding the format icon object in the copy detailed setting screen is illustrated in FIG. 8. With respect to management information items other than a selected value and an action link, values described in the screen management information DB 801 in the ROM 103 are used as static data regarding initial values.

Next, variable data is set in the management information framework (S707). The selected value is variable data that varies depending on a user operation and the state of the image processing apparatus 101, and reflects a value stored in a particular data area held in a particular region of the RAM 104 when the screen is generated. For the format icon, for example, ten icons are prepared in accordance with the layout and the double-sided print setting, which are setting items of the print setting list, and the direction of a document, which is a detailed setting item of the layout. These icons are stored in the image data LUT 803 in the ROM 103 as an array of ten images. A selected value "1" indicates an icon of single-sided printing with no layout that is located at the top of the array. The selected value is a value that remains the same during transition between the copy detailed setting screen and the copy standby screen, and stored in a certain area of the RAM 104 as global variable data. That is, in S707, the stored global variable is reflected by (set to) the generated item of the selected value.

Next, a process for generating and registering a touch action for the GUI component object is executed. A touch action for a GUI component needs to be determined on the basis of a certain rule in accordance with the characteristics of the GUI component, and usability may be improved by providing consistent operability. In this embodiment, various properties regarding display, various properties regarding component function logics, and properties that define actions for touch events are prepared as models for the touch action in the common GUI component library 802. In the common GUI component library 802, for example, action definitions 901 for button components are prepared for the image buttons and the text buttons, and action definitions 902 for drag components are prepared for the multi-copy drum and the list holders. Therefore, a model for the action definitions of touch events is obtained from the common GUI component library 802 (S708), and an action definition table corresponding to the GUI component object is generated in the working memory secured in S702 using the model as the base (S709). Registration of actions is completed by storing a first address of the generated table in the action link (S710).

A common component of the format icon object is an image button, and accordingly the model for the action definitions for button components prepared in the common GUI component library 802 is used. As indicated by the action definitions 901, the target is released in the case of a move event, and actions may be set for other events in accordance with the characteristics during generation of the object. The format icon object is relatively large in size, and there are no other objects around the format icon object. Therefore, as indicated by action definitions 903, no action (NO) is registered for a first touch event because no feedback is needed, and no action (NO) is also registered for a press-and-hold event because no counter function is included. An action of screen transition (return) is registered for touch events such as a tap-and-release event and a push-and-release event. When a tap-and-release event or a push-and-release event has occurred in this object, a back event occurs as a panel event, and the screen changes to the copy standby screen, which is held immediately below the top of a screen transition stack. In registration of a specific action, a head pointer of processing to be executed is set. In the intra-screen process, which will be described later, the action definitions of the GUI component object generated when the screen is changed are referred to and processing according to the action definitions is performed in cases other than "NO".

The processing in S703 to S710 is repeated for all the GUI component objects used in the screen (S711).

In the case of the multi-copy drum object 610 in the number of copies changing pop-up object illustrated in FIG. 6C, common component information is a multi-copy drum, and the model for action definitions is that for drag components. In the action model for drag components, only a push-and-release event and a move event may be set. Therefore, a process for dragging the number of copies is registered for the move event, and a process for determining and displaying the number of copies is registered for the push-and-release event. Through the process for dragging the number of copies, the display of the multi-copy drum is updated in the Y axis direction in accordance with the amount of change in the Y coordinate in touch coordinates, which are an argument of the move event. In addition, through the process for determining and displaying the number of copies, the number of copies is updated in a drag direction in the Y axis direction immediately before the process and a resultant number of copies is determined and displayed as an animation.

Thus, through S703 to S711, touch operations to be performed on the GUI components are classified into those of a button type and those of a list type, and the models for actions for the touch events are prepared in the common GUI component library 802 in addition to component information and component logics. When each screen is to be generated, a consistent operation system for the GUI components may be constructed by the entirety of the image processing apparatus 101 by registering actions corresponding to the touch events on the basis of the touch action models. Although the two most basic types of models for actions for the touch events, namely that of the button type and that of the list type, are prepared in this embodiment, the present disclosure is not limited to these two types, and, for example, models may be increased as necessary in accordance with the characteristics of GUI components to be used.

When management information frameworks and action definitions have been generated and registered for all the GUI component objects to be used in the screen, GUI screen object management information, which is information for managing the state of the entirety of the screen, is generated in a work area (S712). FIG. 8 illustrates an example of generation of GUI screen object management information 808 in the copy detailed setting screen. Whereas the GUI component object management information (for example, the management information 807) is management information for each component, the GUI screen object management information 808 is management information for each screen, and the concept thereof is broader. In the GUI screen object management information 808, screen control variables to be referenced to and set in a process for registering erroneous input countermeasures and a process for executing a touch event action are stored. In S712, an initial value is stored in each item.

Figure 10A:
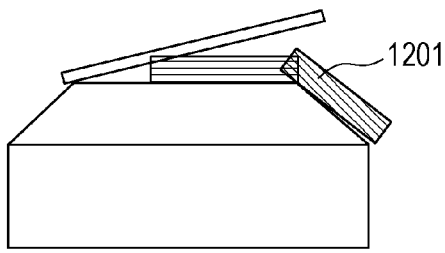
FIGS. 10A to 10C are image diagrams illustrating generation of a touch event in the image processing apparatus caused by static electricity in a document.
Figure 10B:
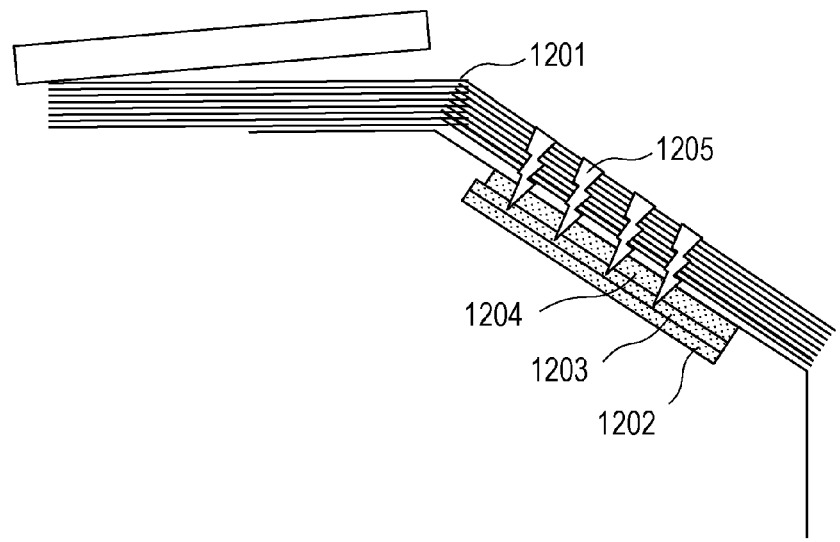

Now, the effect of static electricity upon the operation panel 105 that includes the capacitive touch panel according to this embodiment will be described with reference to FIGS. 10A to 10C. FIG. 10A is a side view of the operation panel 105 at a time when an opened document 1201 such as a book or a magazine is copied or scanned, and FIG. 10B is an image diagram illustrating the enlarged touch panel. More specifically, FIG. 10B is an image diagram illustrating the state of static electricity on the document 1201 such as a book or a magazine covering the touch panel. The capacitive touch panel according to this embodiment has, as illustrated in FIG. 10B, a three-layer structure including a liquid crystal display 1202 as a bottom layer, a touch panel sensor 1203 as an intermediate layer, and a protection sheet 1204 as a top layer. The capacitive touch panel detects a coordinate position on the basis of a change in capacitance caused when an operator's finger has touched a surface thereof. A parameter to be detected at this time is a design value optimized for the image processing apparatus 101 because of the electrical characteristics of the detection method.

As illustrated in FIG. 10A, when the opened document 1201 is to be copied or scanned, part of the opened document 1201 disposed on a platen glass might protrude from the platen glass and cover the touch panel located at the front of the image processing apparatus 101. Because the paper medium is electrically charged, static electricity 1205 is generated from the charged document 1201 to the touch panel sensor 1203.

Now, the static electricity 1205 generated on the touch panel sensor 1203 will be described with reference to FIG. 10C. FIG. 10C is a diagram illustrating the generated static electricity 1205. In FIG. 10C, the horizontal axis represents time, downward arrows indicate beginnings of generation of static electricity, and upward arrows indicate ends of discharge. When static electricity momentarily occurs at a single position, it takes only several milliseconds or less for the static electricity to be fully discharged since the beginning of generation. Therefore, a first touch event occurs, and then a tap-and-release event occurs. However, the charge state of the opened document 1201 changes in accordance with the material of paper, the environment, and the state before the opened document 1201 is disposed on the platen glass. In addition, the position and the timing of generated static electricity vary depending on the length of a gap between the document 1201 and the touch panel. Furthermore, the gap continuously changes depending on how the document 1201 is held onto the platen glass. In addition, the manner of discharge depends on the environment, a chassis, and the material of the document 1201. Therefore, in practice, static electricity not only momentarily occurs at a single position, but, for example, simultaneously occurs in a short period of time of tens of milliseconds at multiple positions, or intermittently occurs in accordance with changes in the length of the gap between the liquid crystal display 1202 and the document 1201 due to slight movement of the document 1201. In these cases, for example, a first touch event initially occurs and then three multi-touch events sequentially occur, and finally a release event occurs. Whether the release event is a tap-and-release event or a push-and-release event depends on the charge state of the document 1201 and the environment, and it is difficult to foresee. It is also difficult to predict a coordinate position to be erroneously detected for the same reason. Therefore, the settings for copying and scanning made by the user before the document 1201 is disposed might be changed by touch events caused by static electricity between the document 1201 and the touch panel after the opened document 1201 is disposed.

Accordingly, in this embodiment, the process for registering erroneous input countermeasures is executed after registering the touch events in accordance with the characteristics of the GUI components (S713).

Whether or not the opened document 1201 is to be scanned may be identified from an application and an operation flow. For example, in the case of an application such as photograph printing in which an image in the memory card 110 is printed, photograph copying in which a large-size photograph document or a 4-by-6-inch photograph document is copied, or a calendar printing in which images in the memory card 110 are combined and printed, nothing covers the operation panel 105. Therefore, erroneous detection of a touch event caused by static electricity between a document and the touch panel such as that in the case of an opened document does not occur. In addition, even in the case of an application such as copying or scanning, no erroneous input countermeasures need to be taken when a screen that mainly displays states with which settings are not changed, such as a guide display screen, a running screen that displays only the state of the image processing apparatus 101, or a job history screen that displays only a job history, is displayed. Accordingly, in this embodiment, whether or not to perform the process for registering erroneous input countermeasures is set in advance for each function or for the screen of each function. FIG. 12 illustrates a table (hereinafter also referred to as an LUT) for determining the process for registering erroneous input countermeasures performed by the image processing apparatus 101 according to this embodiment. In FIG. 12, Y indicates that the process for registering erroneous input countermeasures is performed, and N indicates that the process for registering erroneous input countermeasures is not performed. The determination table is, for example, saved in the RAM 104.

Figure 11:
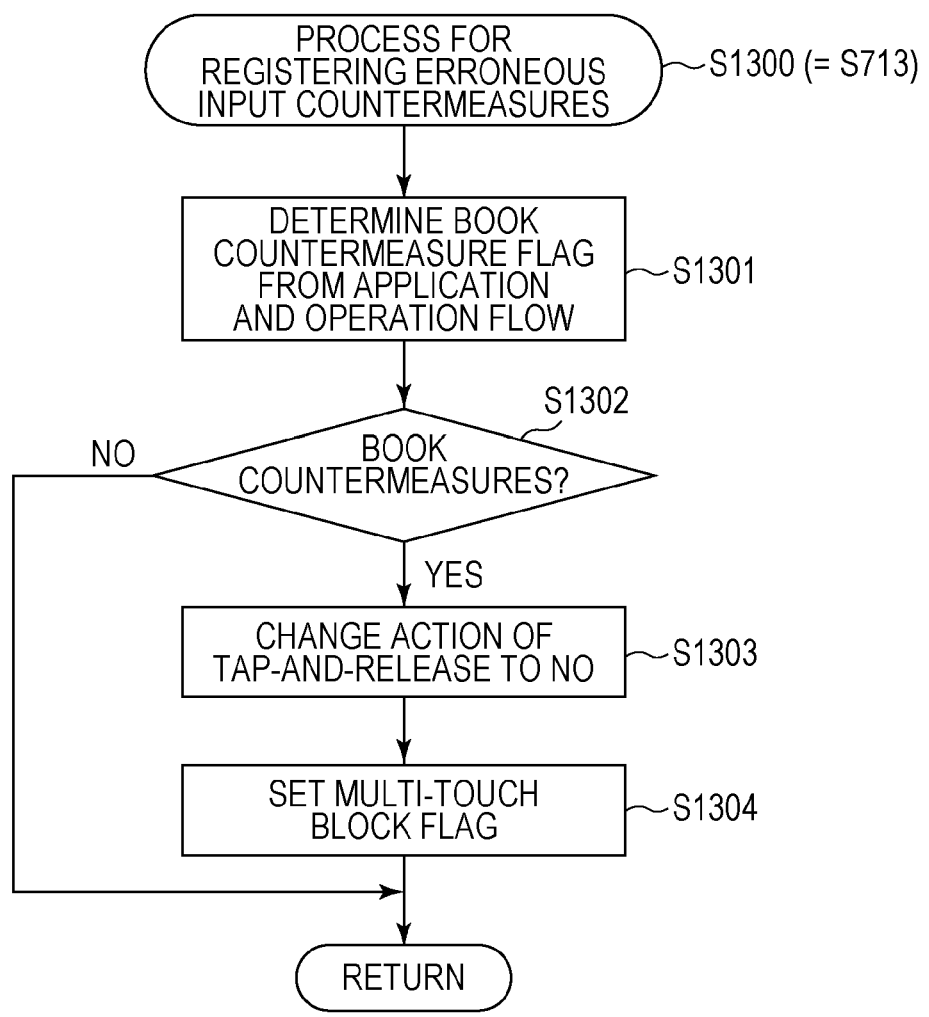
FIG. 11 is a flowchart illustrating a process for registering erroneous input countermeasures performed by the image processing apparatus according to the first embodiment.

Now, the process for registering erroneous input countermeasures will be described in detail with reference to FIG. 11. In the process for registering erroneous input countermeasures, the CPU 102 determines whether or not to take erroneous input countermeasures on the basis of the current application and the operation flow (S1301). That is, the CPU 102 determines a book countermeasure flag on the basis of the application and the operation flow.

In this embodiment, the CPU 102 refers to the LUT illustrated in FIG. 12 using first 8 bits and last 8 bits of a screen ID including an application ID (first 8 bits) and an operation flow ID (last 8 bits), and determines whether or not to take book countermeasures (S1302). The book countermeasures herein refer to the above-described erroneous input countermeasures. If a reference value in the LUT is N, the process for registering erroneous input countermeasures is omitted and the process ends, and if the reference value is Y, two types of erroneous input countermeasures are prepared.

Figure 10C:
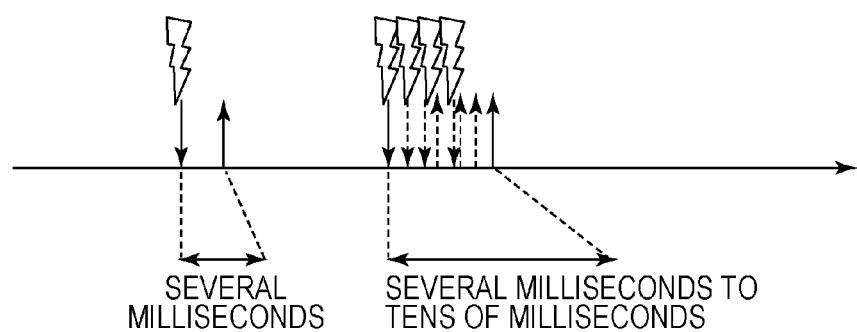

One of the countermeasures against an erroneous input (in FIGS. 10A to 10C, erroneous detection of a book document) deals with momentary static electricity that occurs at a single position illustrated in FIG. 10C. More specifically, the actions corresponding to a tap-and-release event in the action definitions of all the GUI component objects to be used in the screen generated in S703 to S710 are updated to NO (S1303). For example, in the case of the GUI component objects to be used in the copy detailed setting screen, actions corresponding to tap-and-release events of the format icon object, the multi-copy object, and the upward triangular object (downward triangular object) are updated to NO as illustrated in FIG. 13.

The other of the countermeasures against the erroneous input (in FIGS. 10A to 10C, erroneous detection of a book document) deals with static electricity that simultaneously occurs in a short period of time at multiple positions illustrated in FIG. 10C. More specifically, the CPU 102 sets a multi-touch block flag (MTBF) to be referred to in the process for executing a touch event action, which will be described later, performed during the process for changing the screen (S1304). By setting this flag, a GUI component object determined as the operation target before occurrence of a multi-touch event is released, and actions corresponding to touch events are blocked until the multi-touch state is cancelled. Therefore, erroneous recognition of static electricity that simultaneously occurs at multiple positions is blocked.

As a result of the process for registering erroneous input countermeasures described with reference to FIG. 11, when the reference value in the LUT is Y, a reception mode is switched from a normal mode to an erroneous input countermeasure mode. The reception mode herein refers to a mode in which a touch operation is received, and "receiving" refers to detecting a touch operation and validating an instruction based on the touch operation. In this embodiment, among touch operations, a tap-and-release event whose touch elapsed time is shorter than a predetermined period of time is not received in the erroneous input countermeasure mode. In the case of a multi-touch event, touch operations are not received. That is, the erroneous input countermeasure mode in this embodiment refers to a mode in which reception conditions of the touch panel are changed such that, among touch operations, a tap-and-release event whose touch time is shorter than the predetermined period of time is not received and, in a multi-touch event, touch operations are not received.

In FIG. 7, when the process for registering erroneous input countermeasures has been completed, a process for generating and displaying data regarding the liquid crystal display 202 is performed (S714). More specifically, data regarding GUI components necessary for display using the liquid crystal display 202 is collected, and RGB data for one screen is generated in the RAM 104. The screen is then displayed on the liquid crystal display 202 by executing direct memory access (DMA) transfer from the RAM 104 through the LVDS bus 303.

Finally, control for validating or invalidating external buttons according to the screen ID and lighting control of light-emitting diodes (LEDs) associated with the validness of the external buttons are executed (S715), and the process for changing the screen ends.

Figure 14:
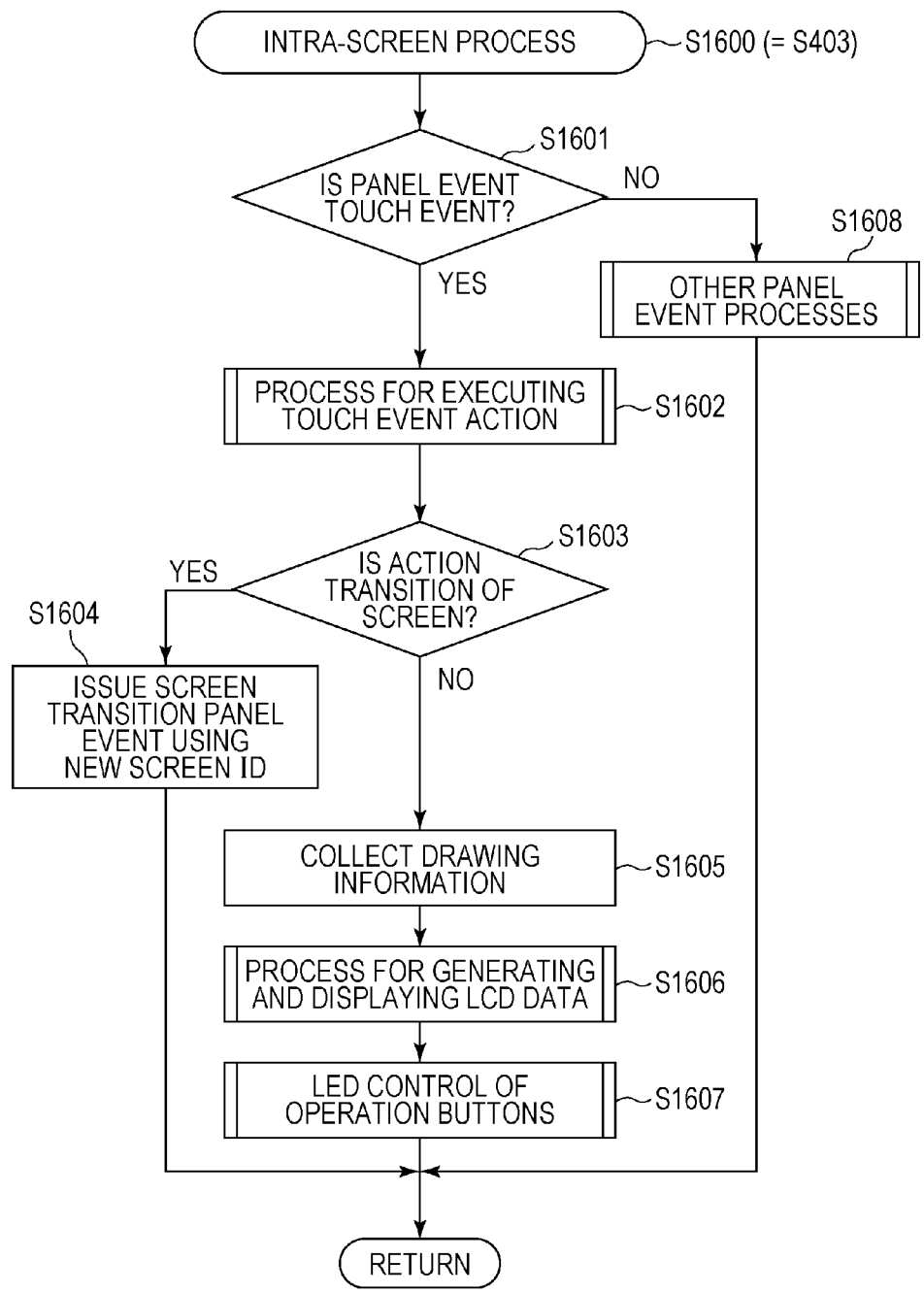
FIG. 14 is a flowchart illustrating an intra-screen process performed by the image processing apparatus according to the first embodiment.

Now, the intra-screen process performed in S403 will be described with reference to FIGS. 14 and 15. The intra-screen process performed in S403 is a foreground process performed for a touch event that occurs when an operation has been performed on the touch panel after a new screen is displayed by the process for changing the screen. FIG. 14 is a flowchart illustrating the intra-screen process executed by the CPU 102, and FIG. 15 is a flowchart illustrating the process for executing a touch event action executed by the CPU 102.

In the intra-screen process, first, the CPU 102 determines whether or not a current panel event is a touch event (S1601). In addition to the touch events such as a first touch event, a tap-and-release event, a push-and-release event, a move event, a press-and-hold event, and a multi-touch event, a timer event for displaying an animation in which the screen is updated at time intervals of 100 ms and the like are handled in the intra-screen process.

Figure 15:
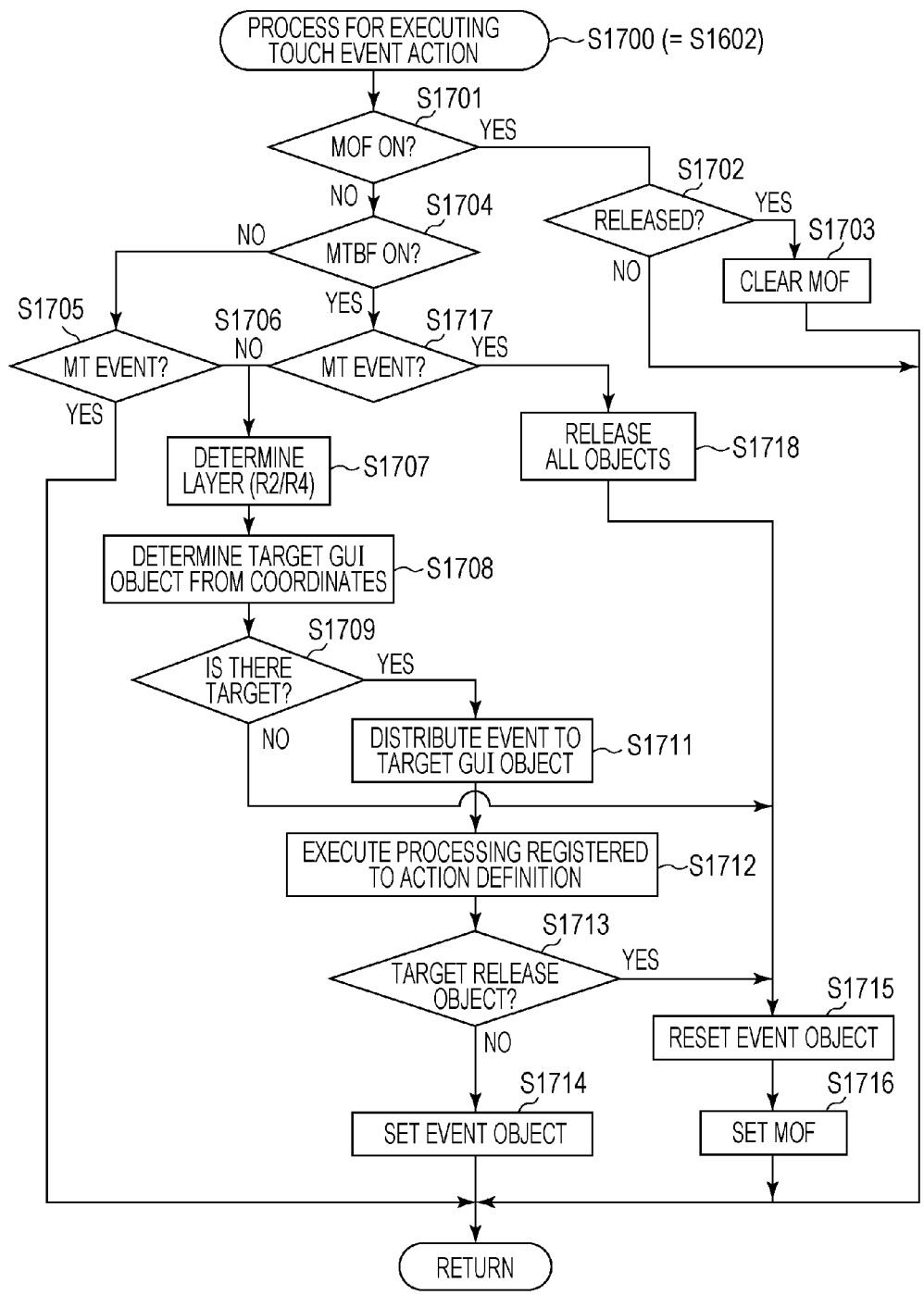
FIG. 15 is a flowchart illustrating a process for executing a touch event action performed by the image processing apparatus according to the first embodiment.

If the panel event is a touch event, the process for executing a touch event action illustrated in FIG. 15 is executed (S1602).

Now, the process for executing a touch event action will be described. First, the CPU 102 determines whether or not a move-out detection flag (MOF) is on (S1701). The MOF is one of the items of the GUI screen object management information 808 generated and initialized in S712 of the process for generating a screen during the transition of the screen. When the MOF is on, a touch input to the touch panel is being detected, but there is no GUI component object as an operation target (move-out state).

If the MOF is on, that is, in the move-out state, the process ends without performing any processing until a release event, which is a release condition, occurs (S1702). If a release event occurs while the MOF is set, the MOF is cleared and a normal state is established (S1703).

If the MOF is off in S1701, the CPU 102 refers to the MTBF in the screen management information set in S1304 on the basis of the current application and the operation flow, and determines whether or not the MTBF is on (S1704).

If the MTBF if off and the current touch event is a multi-touch event (S1705), the process ends without performing any processing for the current touch event. In a screen with which the opened document 1201 does not cover the touch panel, it is unlikely that multi-touch events that are not intended by the user sequentially occur. It is likely that the multi-touch event has occurred because while an operation is being performed on a target object, another finger has accidentally touched the touch panel. Therefore, the user operation is allowed to continue without releasing the target object, and only the current multi-touch event is neglected.

If the current event is not a multi-touch event (S1706), a process for determining a target GUI component object on which the current touch event is being performed is executed, and a target layer is determined (S1707). Touch events are handled by GUI component objects on the top layer. For example, a pop-up GUI component object 608 such as the number of copies changing object illustrated in FIG. 6C is registered to Layer 0 when the screen is generated during the transition of the screen, and touch events are not handled in this state. The number of copies changing object 608 pops up when the layer registration has been changed from 0 to 4 by the processing registered in the action definition of the multi-copy object for a push-and-release event after a touch event occurs for the multi-copy object and then a push-and-release event occurs. Layer information is state information regarding the entirety of the screen, and active layer information is updated to 4 in addition to the update of the layer for the number of copies changing object 608 in the process. The active layer information is one of the items of the GUI screen object management information 808 generated and initialized in S712. In S1707, a target layer is determined by referring to the active layer information. If it is determined in S1704 that the MTBF is on and the current event is not a multi-touch event, the target layer is also determined.

Next, a target GUI component object is determined from a group of GUI components in the target layer by comparing coordinate information, which is an event argument, and the object management information (S1708). More specifically, a target GUI component object is identified from all the GUI component objects in the target layer by comparing touch area information in the object management information and the coordinate information, which is an argument of the current touch event.

The CPU 102 determines whether or not there is a target GUI component object (S1709), and if a target GUI component object is identified, the touch event is distributed to the object (S1711), and the processing registered in the action definitions in S710 is executed (S1712).

Next, the CPU 102 checks whether or not there is a GUI component object to be released (S1713). In the case of an object that uses the model for the action definitions of button components, an action of release of the target is registered for a move event. In the case of the format icon object or the multi-copy object in the copy detailed setting screen, the target is released by a move event even in a touch area on the basis of the registered content of the action definition (the action definition 1501 or 1502, respectively). On the other hand, in the case of an object that uses the model for the action definitions of drag components, such as the multi-copy drum object, move-out is not determined until the coordinate position, which is an argument, is deviated from the touch area registered in the management information.

If an object to be released is not detected in S1713, the CPU 102 determines that a valid touch operation is being performed on the GUI component object. Therefore, information regarding the GUI component object is set in event object information in the GUI screen object management information (S1714). The content to be set may be a first address of the management information regarding the target GUI component object, or may be the unique ID of the GUI component object. As described above, since the GUI component objects are arranged in a hierarchical structure, a format in which the GUI component objects may be managed in the form of a list is desirable.

On the other hand, if an object to be released is detected in S1713, the event object is reset (S1715). That is, the content of the event object is reset to the initial value, which is "no target". At the same time, move-out is determined, and the MOF is set (S1716). The process ends and the CPU 102 waits for a release event.

If a target object is not detected in S1709, the position of the first touch has been a position at which no GUI component exists or a target object is initially identified by the first touch but the target object is deviated from the touch area because the finger has moved thereafter. In this case, as in S1713, the process proceeds to S1715. The event object is reset, the MOF is set, and the process ends.

If the MTBF is on in S1704 and the current event is a multi-touch event (S1717), all target GUI component objects are released regardless of the coordinate information, which is an event argument, and the touch area in the management information (S1718). More specifically, the target GUI component objects are detected from the above-described event object information, and a process for releasing all the identified GUI component objects is executed. The content of the process for releasing the GUI component objects is prepared when the action definitions of the GUI component objects are generated and registered. The process for releasing all the objects performed in S1718 corresponds to a process for resetting the processing to be executed registered for a touch (first touch) event to a state before the registration. Thereafter, the process proceeds to S1715. The event object is reset, the MOF is set, and the process ends. Until a release event occurs, all the touch events are invalidated. That is, in the intra-screen process for a screen for which the MTBF has been set, a GUI component object that has been determined as an operation target before occurrence of a multi-touch event is released using the multi-touch event as a trigger, and blocked until a release event occurs. Therefore, in the screen for which the MTBF has been set, erroneous recognition of touch events due to static electricity that simultaneously occurs at multiple positions may be avoided.

In FIG. 14, when the process for executing a touch event action has been completed, the CPU 102 determines whether or not the executed action is transition of the screen (S1603). If the executed action is transition of the screen, the CPU 102 issues a screen transition panel event using the screen ID of the new screen as an argument, and ends the intra-screen process (S1604). If the executed action is not transition of the screen, the CPU 102 collects drawing information (S1605). That is, data regarding GUI components necessary for display using the liquid crystal display 202 is collected. Next, the current screen is displayed on the liquid crystal display 202 by generating RGB data for one screen in the RAM 104 and executing DMA transfer from the RAM 104 through the LVDS bus 303 (S1606). Finally, the CPU 102 executes the control for validating or invalidating the external buttons according to the screen ID and the lighting control of the LEDs associated with the validness of the external buttons (S1607), and ends the intra-screen process.

In the control of the operation buttons and the LEDs in the intra-screen process, the event object information determined in the process for executing a touch event action is used as an argument. When the event object information indicates that there is a target, a valid touch operation is being performed on the GUI component. Therefore, in this case, control is performed such that inputs to the external keys are masked so that an operation that is not intended by the user is not performed even if part of the user's body touches one of the external keys. On the other hand, when there is no target or in the case of move-out, there is no valid touch operation that is being performed on the GUI component or a touch operation is no longer performed. Therefore, inputs to the external keys are validated, and processing according to an input to one of the external keys is executed.

In this embodiment, in the case of a parameter setting screen with which it is possible that a document to be read touches the touch panel as in copying or scanning, GUI components to be used do not receive a short touch operation such as a tap operation, and respond only to touch operations whose touch time is longer than that of the tap operation. Therefore, erroneous inputs of touch operations may be avoided.

In addition, in this embodiment, when a touch input has changed from a single-touch input to a multi-touch input during a determination of a tap operation whose touch time is long, the touch input itself is invalidated. In doing so, an erroneous input caused when a document has touched the touch panel at a plurality of positions in a short period of time may be avoided.

Thus, in this embodiment, unintended changing caused by parameters caused by a document may be suppressed. That is, satisfactory operability of the touch panel may be secured in the normal mode, whereas erroneous inputs that are not intended by the user may be suppressed in the erroneous input countermeasure mode.

Second Embodiment

In the first embodiment, erroneous detection of static electricity that momentarily occurs at a single position is suppressed by updating the tap-and-release event of GUI component objects to NO. In this embodiment, the tap-and-release event of GUI screen objects is updated to NO. Description of the same components as those according to the first embodiment is omitted.

In this embodiment, a tap-and-release block flag (TRBF) is prepared as an item of the GUI screen object management information 808 illustrated in FIG. 8 and initialized to OFF when the screen is generated in S712. Thereafter, in the process for registering erroneous input countermeasures performed in S713, the TRBF is set instead of performing S1303. In the intra-screen process performed in S1600, the TRBF is determined before the MTBF is determined in S1704 in the process for executing a touch event action. If the TRBF has been set and the current event is a tap-and-release event, the process proceeds to S1718 and all the objects are released as in the case of a multi-touch event at a time when the MTBF has been set.

In doing so, the process executed by the CPU 102 may become simpler than that in the first embodiment. In addition, as in the first embodiment, satisfactory operability of the touch panel may be secured in the normal mode, whereas erroneous inputs that are not intended by the user may be suppressed in the erroneous input countermeasure mode.

Third Embodiment

In the first embodiment, a move event, which corresponds to a "drag operation" in which a finger that has touched the touch panel moves, is recognized, but a flick event, which corresponds to a "flick operation" in which a finger that has touched the touch panel quickly moves and leaves the touch panel, is not recognized. On the other hand, in this embodiment, the flick event is recognized. Description of the same components as those according to the first embodiment is omitted.

In this embodiment, control of the history of detected positional information and a process for determining a flick event based on the history are added to the process for generating a touch event illustrated in FIG. 5. More specifically, the CPU 102 refers to history information immediately before the determination as to the type of release event based on the touch counter made in S520, and if moving speed of latest N movements is equal to or higher than a threshold, determines that the release has been performed after a quick movement and issues a flick event. The number of movements, the amount of movement, and the moving speed may be optimized in accordance with the characteristics in a state in which electrical components and mechanical components to be used have been incorporated.

FIG. 16A illustrates models for action definitions of GUI common components that recognize a flick event according to this embodiment. As illustrated in FIG. 16A, in the model for the action definitions of button components, an action corresponding to a flick event is "not settable", and in the model for the action definitions of drag components, an action corresponding to a flick event is a "flick". In the execution of the processing registered in the action definitions in S1712, an animation in which a currently displayed state changes to display of a next page item is activated. For example, examples 1803 and 1804 are examples of display at a time when the print setting list object 607 in the copy detailed setting screen has been flicked. As described in the first embodiment, the print setting list object 607 includes seven items, and the list holder is a four-list component, which means that four items may be displayed at a time. Therefore, two pages of display exist. The example 1803 represents a state in which a first page is displayed. When the print setting list object 607 has been flicked, an animation starts at a frame rate of 10 frames per second so that the first page represented by the example 1803 changes to a second page represented by the example 1804 in one second.

In this embodiment, as in the first embodiment, satisfactory operability of the touch panel may be secured in the normal mode, whereas erroneous inputs that are not intended by the user may be suppressed in the erroneous input countermeasure mode. Furthermore, in this embodiment, by recognizing a flick operation, list items may be quickly scrolled.

Although the present disclosure has been described with reference to the embodiments, the basic configuration of the present disclosure is not limited to those described above. For example, although the image processing apparatus 101 does not include an automatic document feeder (ADF) in the above-described embodiments, the present disclosure may also be applied if the image processing apparatus 101 includes the ADF. In this case, when a document is to be scanned using the ADF, ADF copying and ADF scanning are added to the LUT illustrated in FIG. 12 as applications. All the items may be set to N and book countermeasures are not taken.

Although the image processing apparatus 101 having a scanning function and a printing function has been described as an example in the above-described embodiments, the present disclosure is not limited to this. For example, a scanning apparatus that does not have a printing function may be used, or a data processing apparatus other than the image processing apparatus 101 may be used, instead.

Although the capacitive touch panel to which an input may be made by a light touch operation has been described in the above-described embodiments, the touch panel is not limited to this. However, the present disclosure is particularly effective for a capacitive touch panel.

Although erroneous input countermeasures are taken when a screen in which various settings of the scanning function and the printing function may be made is displayed in the above-described embodiments, the erroneous input countermeasures may be taken when a screen other than the screen in which various settings of these functions may be made is displayed, instead. In doing so, erroneous inputs that are not caused by a document may also be suppressed.

Although the erroneous input countermeasures are automatically set for each function or for the screen of each function in the above-described embodiments, the erroneous input countermeasures may be manually set to ON or OFF, instead. In addition, although the automatic setting of the erroneous input countermeasures is performed for each function or the screen of each function, the present disclosure is not limited to this, and, for example, the automatic setting of the erroneous input countermeasures may be performed for each user, instead.

Although the tap-and-release event among touch operations is not received in the erroneous input countermeasure mode in the above-described embodiments, the present disclosure is not limited to this. For example, the tap-and-release event may be valid while determining the recognition time of the tap to be longer than that in the normal mode. According to the present disclosure, satisfactory operability of the touch panel may be secured in a first mode, whereas erroneous inputs that are not intended by the user may be suppressed in a second mode.

Not all the above-described processes need to be realized by software, and some or all of the processes may be realized by hardware, instead.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims priority from Japanese Patent Application No. 2012-203087, filed Sep. 14, 2012, which is hereby incorporated by reference herein in its entirety.

What is claimed is:

1. An apparatus comprising:
 a detection unit configured to detect a touch operation performed on an operation panel that displays a display screen;
 an execution unit configured to execute an action corresponding to the touch operation detected by the detection unit; and
 a suppressing unit configured to suppress execution of the action by the execution unit in accordance with a type of function being executed in the apparatus and/or the display screen being displayed on the operation panel,
 wherein, in a case where a predetermined function is being executed in the apparatus and/or a predetermined display screen is being displayed on the operation panel, the suppressing unit suppresses execution of an action by the execution unit corresponding to a first touch operation of which a time between a touch determination and a release determination is shorter than a predetermined time.

2. The apparatus according to claim 1,
 wherein the detection unit detects the touch operation performed on the touch panel based on a change in capacitance.

3. The apparatus according to claim 1,
 wherein, in a case where the predetermined function is being executed in the apparatus and/or the predetermined display screen is being displayed on the operation panel, the suppressing unit suppresses execution of an action corresponding to a touch operation by the execution unit while the detection unit detects a multi-touch operation.

4. The apparatus according to claim 3, wherein, in a case where the predetermined function is being executed in the apparatus and/or the predetermined display screen is being displayed on the operation panel, the suppressing unit blocks an action corresponding to a touch operation until a multi-touch state is cancelled.

5. The apparatus according to claim 1, further comprising:
 an obtaining unit configured to obtain information for setting whether the process or not to suppress execution of the action corresponding to the touch operation of which a time between a touch determination and a release determination is shorter than the predetermined time for at least one of each of the functions and each of the display screens,
 wherein the suppressing unit suppresses execution of the action corresponding to the first touch by the execution unit based on the information obtained by the obtaining unit.

6. The apparatus according to claim 1,
 wherein, in a case where a reading device is to read a document, the suppressing unit suppresses execution of the action by the execution unit corresponding to the first touch operation of which a time between a touch determination and a release determination is shorter than the predetermined time.

7. The apparatus according to claim 1,
 wherein, in a case where a standby screen, a detailed setting screen, and/or a job cancel screen is being displayed on the operation panel, the suppressing unit suppresses execution of the action corresponding to the touch operation of which a time between a touch determination and a release determination is shorter than the predetermined time.

8. The apparatus according to claim 1,
 wherein the suppressing unit suppresses execution of an action corresponding to a touch operation on a predetermined component objection of the display screen displayed on the operation panel.

9. The apparatus according to claim 1, wherein, in a case where the predetermined function is not being executed in the apparatus and/or the predetermined display screen is not being displayed on the operation panel, the suppressing unit does not suppress execution of the action by the execution unit corresponding to the first touch operation of which a time between a touch determination and a release determination is shorter than the predetermined time.

10. The apparatus according to claim 1, further comprising a determination unit configured to determine whether a touch time of the touch operation detected by the detection unit is longer than or equal to the predetermined time, and
 wherein the suppressing unit suppresses execution of the action by the execution unit based on a determination result by the determination unit.

11. The apparatus according to claim 1, wherein in a case where the predetermined function is being executed in the apparatus and/or the predetermined display screen is being displayed on the operation panel, the suppressing unit invalidates the action corresponding to the first touch operation.

12. A method comprising:
 detecting a touch operation performed on an operation panel that displays a display screen;
 executing an action corresponding to the detected touch operation; and
 suppressing execution of the action by the executing in accordance with a type of function being executed in an apparatus and/or the display screen displayed on the operation panel,
 wherein, in a case where a predetermined function is being executed in the apparatus and/or a predetermined display screen is being displayed on the operation panel, the suppressing unit suppresses execution of an action by the execution unit corresponding to a first touch operation of which a time between a touch determination and a release determination is shorter than a predetermined time.

13. The method according to claim 12,
 wherein the touch operation performed on the touch panel is detected based on a change in capacitance.

14. The method according to claim 12,
 wherein, in a case where the predetermined function is being executed in the apparatus and/or the predetermined display screen is being displayed on the operation panel, execution of an action corresponding to a touch operation is suppressed while a multi-touch operation is detected.

15. The method according to claim 12, further comprising:
obtaining information for setting whether or not to suppress execution of the action corresponding to the touch operation of which a time between a touch determination and a release determination is shorter than the predetermined time for at least one of each of functions and each of display screens,
wherein execution of the action corresponding to the first touch is suppressed based on the information obtained.

16. The method according to claim 12,
wherein, in a case where a reading device is to read a document, the process execution of the action corresponding to the touch operation of which a time between a touch determination and a release determination is shorter than the predetermined time is suppressed.

17. A non-transitory computer-readable recording medium storing a program for causing a computer to function as an apparatus comprising:
a detection unit configured to detect a touch operation performed on an operation panel that displays a display screen;
an execution unit configured to execute an action corresponding to the touch operation detected by the detection unit; and
a suppressing unit configured to suppress execution of the action by the execution unit in accordance with a type of function being executed in the apparatus and/or the display screen displayed on the operation panel,
wherein, in a case where a predetermined function is being executed in the apparatus and/or a predetermined display screen is being displayed on the operation panel, the suppressing unit suppresses execution of an action by the execution unit corresponding to a first touch operation of which a time between a touch determination and a release determination is shorter than a predetermined time.

18. The apparatus according to claim 1, wherein, in a case where a copy function and/or a scan function is being executed in the apparatus, the suppressing unit suppresses execution of the action corresponding to the touch operation of which a time between a touch determination and a release determination is shorter than the predetermined time.

19. The apparatus according to claim 1, wherein the function being executed is determined based on an application being executed.

20. The apparatus according to claim 1, wherein, in a case where a touch time of the touch operation detected by the detection unit is equal to or greater than the predetermined time, the execution unit executes the action corresponding to the touch operation.

21. The apparatus according to claim 1, further comprising a printing unit.

22. The apparatus according to claim 1, further comprising an image reading unit.

* * * * *